(12) United States Patent
Tabata et al.

(10) Patent No.: US 9,114,987 B2
(45) Date of Patent: Aug. 25, 2015

(54) OZONE GENERATION SYSTEM

(75) Inventors: Yoichiro Tabata, Tokyo (JP); Shinichi Nishimura, Tokyo (JP); Noriyuki Nakamura, Tokyo (JP); Yujiro Okihara, Tokyo (JP)

(73) Assignee: TOSHIBA MITSUBISHI-ELECTRIC INDUSTRIAL SYSTEMS CORPORATION, Tokyo (JP)

(*) Notice: Subject to any disclaimer, the term of this patent is extended or adjusted under 35 U.S.C. 154(b) by 0 days.

(21) Appl. No.: 14/345,807

(22) PCT Filed: Aug. 30, 2012

(86) PCT No.: PCT/JP2012/071960
§ 371 (c)(1),
(2), (4) Date: Mar. 19, 2014

(87) PCT Pub. No.: WO2014/033870
PCT Pub. Date: Mar. 6, 2014

(65) Prior Publication Data
US 2014/0219883 A1    Aug. 7, 2014

(51) Int. Cl.
*C01B 13/11*    (2006.01)
*B01J 35/02*    (2006.01)
(52) U.S. Cl.
CPC ............... *C01B 13/11* (2013.01); *B01J 35/02* (2013.01); *C01B 2201/10* (2013.01); *C01B 2201/20* (2013.01); *C01B 2201/64* (2013.01); *C01B 2201/70* (2013.01); *C01B 2201/90* (2013.01)
(58) Field of Classification Search
CPC    C01B 13/11; C01B 2201/90; C01B 2201/10; C01B 2201/20; C01B 2201/64; C01B 2201/70; B01J 35/02
See application file for complete search history.

(56) References Cited

U.S. PATENT DOCUMENTS

| 5,047,127 A | 9/1991 | Tottori et al. |
| 5,810,978 A | 9/1998 | Nakatsuka et al. |
| 6,589,397 B1 | 7/2003 | Tanimura et al. |

(Continued)

FOREIGN PATENT DOCUMENTS

| CN | 2647828 Y | 10/2004 |
| CN | 1774394 A | 5/2006 |

(Continued)

OTHER PUBLICATIONS

International Search Report issued Oct. 9, 2012, in PCT/JP12/071960 filed Aug. 30, 2012.

(Continued)

*Primary Examiner* — Kishor Mayekar
(74) *Attorney, Agent, or Firm* — Oblon, McClelland, Maier & Neustadt, L.L.P.

(57) ABSTRACT

In the present invention, a gas flow rate adjustment apparatus that outputs a raw material gas to an ozone generation apparatus is provided. The gas flow rate adjustment apparatus includes a plurality of flow rate adjustment parts, and outputs a second mixed gas serving as the raw material gas to the ozone generation apparatus. The second mixed gas includes an oxygen gas outputted from a first oxygen flow rate adjustment part and a first mixed gas outputted from a mixed gas flow rate adjustment part. The raw material gas generated by the gas flow rate adjustment apparatus, which includes an oxygen gas and a nitrogen gas, contains the nitrogen gas added to the oxygen gas with the rate of addition being in a range of more than 0 PPM and not more than 100 PPM.

6 Claims, 11 Drawing Sheets

(56) References Cited

U.S. PATENT DOCUMENTS

| | | |
|---|---|---|
| 7,382,087 B2 | 6/2008 | Tabata et al. |
| 7,402,289 B2 | 7/2008 | Tabata |
| 8,075,844 B2 | 12/2011 | Tabata |
| 8,444,831 B2 | 5/2013 | Tabata et al. |
| 2006/0049738 A1 | 3/2006 | Tabata et al. |
| 2008/0206115 A1 | 8/2008 | Tabata et al. |

FOREIGN PATENT DOCUMENTS

| | | |
|---|---|---|
| JP | 1-282104 | 11/1989 |
| JP | 3-218905 | 9/1991 |
| JP | 8-59213 | 3/1996 |
| JP | 9-208202 | 8/1997 |
| JP | 9-235103 | 9/1997 |
| JP | 2004-359537 | 12/2004 |
| JP | 2005-164160 A | 6/2005 |
| JP | 2005-194160 | 7/2005 |
| JP | 2011-98886 | 5/2011 |
| TW | 200530120 | 9/2005 |
| WO | WO 2005/080263 A1 | 9/2005 |

OTHER PUBLICATIONS

Taiwanese Search Report issued Jul. 22, 2014 in Patent Application No. 101143401with Partial English Translation.

International Preliminary Report on Patentability dated Mar. 12, 2015 issued in corresponding application No. PCT/JP2012/071960 (with English translation).

Search Report issued in Chinese Office Action of May 12, 2015 in Chinese Patent Application No. 201280069495.2, with Partial English Translation.

F I G . 1
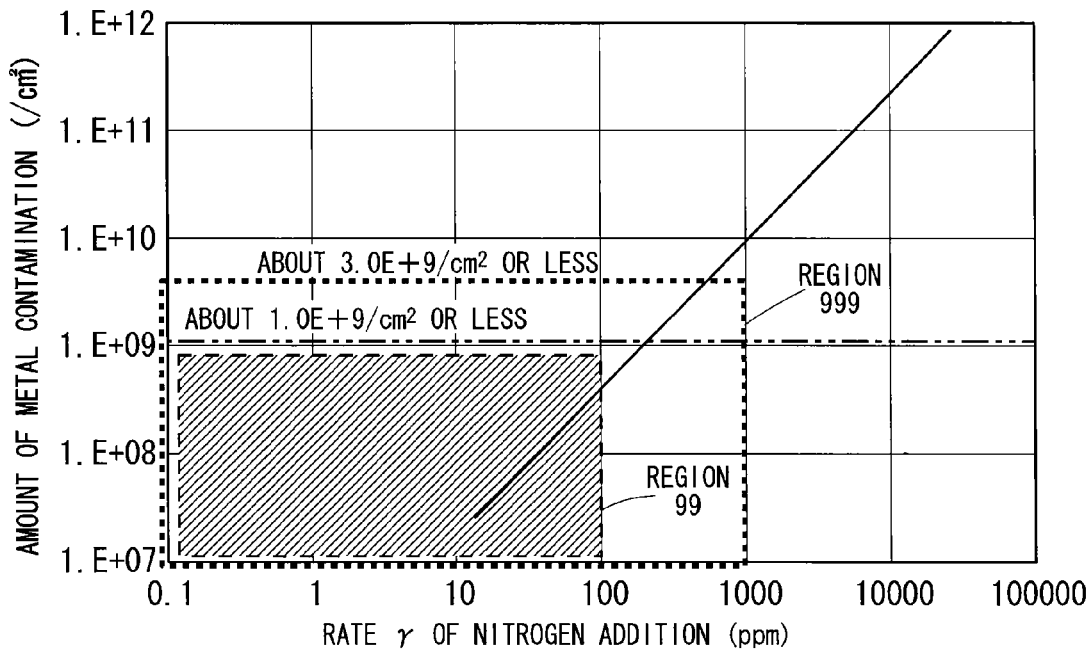
F I G . 2
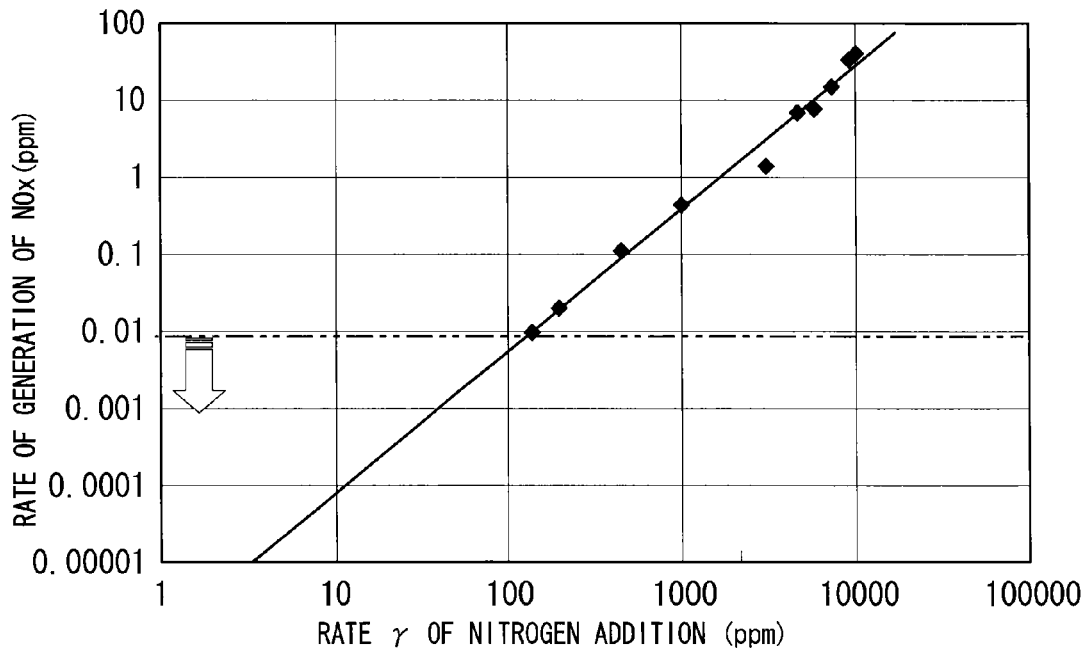

F I G . 4
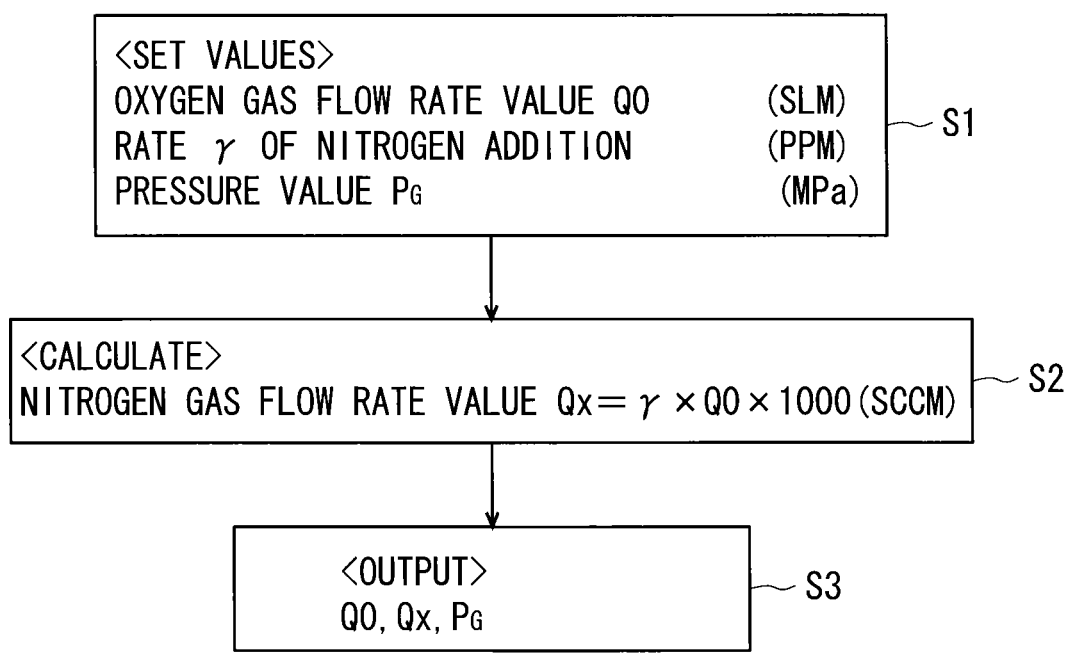

F I G . 6
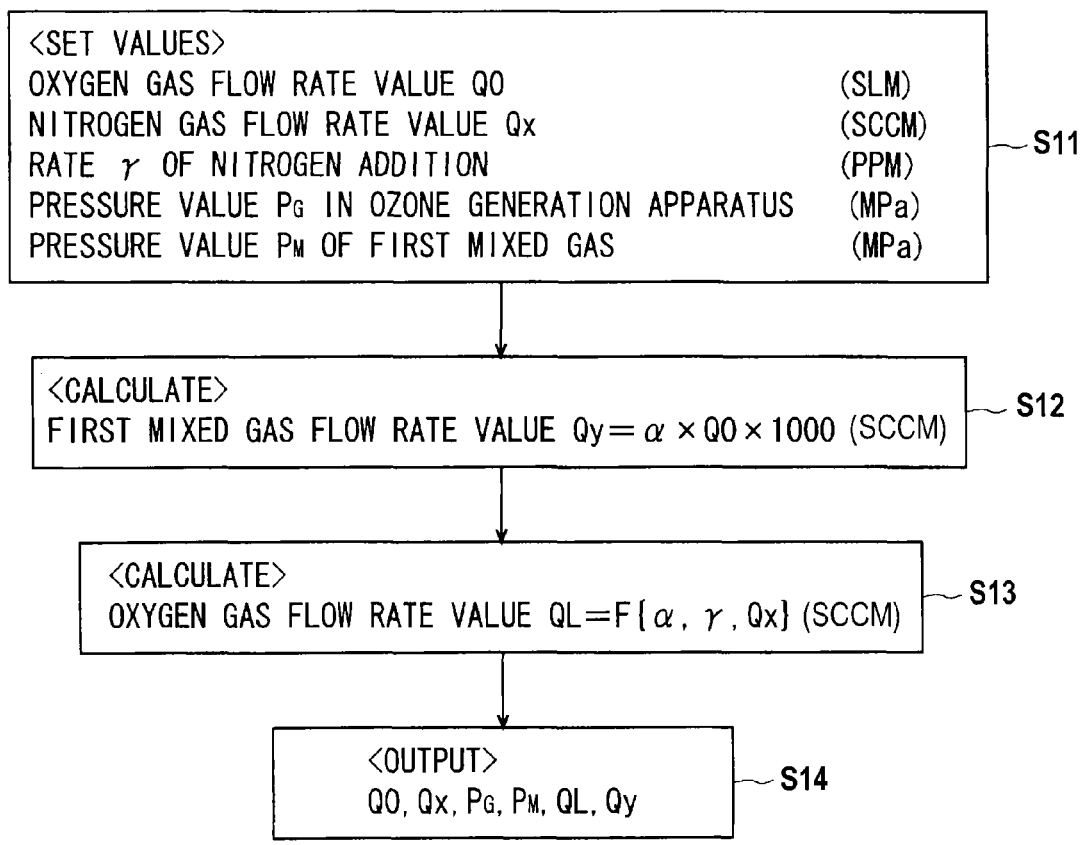

OZONE GENERATION SYSTEM

TECHNICAL FIELD

The present invention relates to an ozone generation system configured to supply a raw material gas containing high purity oxygen to an ozone generation apparatus.

BACKGROUND ART

Conventional techniques for supplying an oxygen gas and a nitrogen gas into an ozone generation apparatus in order to generate an ozone gas are shown in, for example, Patent Documents 1 to 4.

In the techniques shown in Patent Documents 1 to 4, a raw material gas is supplied to an ozone generation apparatus. Here, the raw material gas contains a nitrogen gas of not less than several hundred PPM (and more, several thousand PPM) added to an oxygen gas. In the ozone generation apparatus, an ozone gas is generated from the raw material gas by using a silent discharge. In this manner, in the techniques according to Patent Documents 1 to 4, adding the nitrogen gas of not less than several hundred or several thousand PPM to the oxygen gas allows generation of a high-concentration ozone gas.

As shown in FIG. 12, an ozone generation apparatus 330 according to Patent Documents 1 to 4 includes discharge surfaces (main surfaces that confront electrodes 301a and 301b) facing a discharge space where the silent discharge occurs. At least one side of the discharge surface, a dielectric material 302 made of alumina ceramic or the like is formed (however, the discharge surface facing the discharge space of the ozone generation apparatus 330 includes an ordinary metal material or insulating material having no photocatalytic material). In the discharge space of the ozone generation apparatus 330, an AC voltage is applied to the oxygen gas (raw material gas) containing a large amount of nitrogen as illustrated in Patent Documents 1 to 4, thereby causing a silent discharge. As a result, the ozone generation apparatus 330 generates a high-concentration ozone gas.

In the ozone generation apparatus 330 of Patent Documents 1 to 4, a mechanism of ozone generation is explained based on the theory of particle collisional dissociation. Here, the theory of particle collisional dissociation explains a detailed mechanism for generating a high-concentration ozone gas from an oxygen gas containing a nitrogen gas added thereto. This theory explains a mechanism in which generation of a short-gap silent discharge achieves a high electric field discharge so that an electron having high energy collides with an oxygen molecule, resulting in dissociation of an oxygen gas.

In the ozone generation based on the theory of particle collisional dissociation, a high-concentration ozone gas can be generated irrespective of the amount of added nitrogen contained in a raw material oxygen gas (irrespective of whether or not nitrogen is added). However, the following fact has been confirmed experimentally. That is, in a case where an oxygen gas to which a large amount of nitrogen gas is not added is adopted as a raw material gas, a high-concentration ozone gas cannot be generated even though a short-gap silent discharge is achieved in the ozone generation apparatus 330. For example, in the actual ozone generation apparatus 330, use of an oxygen gas containing no nitrogen results in a failure to generate a high-concentration ozone gas of about 200 g/m$^3$ (160000 ppm) or more, and merely a low-concentration ozone gas of about 20 g/m$^3$ (9333 ppm) can be generated.

Therefore, a mechanism for generating the high-concentration ozone gas in the ozone generation apparatus 330 configured as shown in FIG. 12 cannot be sufficiently explained by the theory of particle collisional dissociation.

The fact that the theory of particle collisional dissociation cannot explain the mechanism of ozone gas generation in the ozone generation apparatus 330 will be detailed little more.

In a silent discharge (dielectric material barrier discharge), generally, a high electric field plasma is obtained depending on a discharge gap length d and gas pressure P. In the ozone generation apparatus 330, generally, the discharge gap d is in a range from several mm to 0.05 mm that is a short gap, and the gas pressure P is in a range from the atmospheric pressure (0.1 MPa) to 0.4 MPa. In the dielectric material barrier discharge under the discharge gap length d and the gas pressure P within such ranges, the plasma density of ion/electron is about $10^8$ (/cm$^3$) to $10^{10}$ (/cm$^3$).

In a case where a raw material gas containing a large amount of nitrogen (about 10000 ppm) added to an oxygen gas is supplied into plasma with a plasma density of $10^{10}$ (/cm$^3$), an ozone molecule density σmax (/cm$^3$) that provides a maximum ozone concentration of 290 g/m$^3$ (135000 ppm) shown in FIG. 13 which will be described later is as follows, based on the theory of particle collisional dissociation (the oxygen gas and electrons repeatedly and frequently collide with each other, to dissociate the oxygen gas into oxygen atoms).

The ozone molecule density σmax={1.35×10$^5$/10$^6$}× 6.02×10$^{23}$/2.24×10$^4$=~3.63×10$^{18}$ (/cm$^3$).

In a case where a raw material gas containing a small amount of nitrogen (about 1 ppm) added to an oxygen gas is supplied into plasma with a plasma density of $10^{10}$ (/cm$^3$), an ozone molecule density σmin (/cm$^3$) that provides an ozone concentration of 40 g/m$^3$ (32000 ppm) shown in FIG. 13 which will be described later is as follows, based on the theory of particle collisional dissociation (the oxygen gas and electrons repeatedly and frequently collide with each other, to dissociate the oxygen gas into oxygen atoms).

The ozone molecule density σmin={3.2×10$^4$/10$^6$}×6.02× 10$^{23}$/2.24×10$^4$=8.6×10$^{16}$ (/cm$^3$).

Thus, under the same plasma density, addition of a large amount of nitrogen (10000 ppm) generates ozone having a molecule density of 3.63×10$^{18}$ (/cm$^3$), while adding a small amount of nitrogen (1 ppm) generates ozone having a molecule density of 8.6×10$^{16}$ (/cm$^3$).

As described above, the molecule density of generated ozone varies in double digits depending on the amount of added nitrogen. This result means that the mechanism of ozone generation in the ozone generation apparatus 330 is not sufficiently explained by the theory of particle collisional dissociation that is based on a high electric field discharge.

In this respect, Patent Document 5 discloses that the mechanism of ozone gas generation in the ozone generation apparatus 330 is based on a catalytic activity.

As described above, under the condition of the plasma with a plasma density of $10^{10}$ (/cm$^3$), it is assumed that the ozone molecule density is $10^{14}$ to $10^{16}$ (/cm$^3$) order when the theory of particle collisional dissociation is adopted. However, the actual ozone molecule density is as high as $10^{18}$ (/cm$^3$). Therefore, it is inferred that, due to the behavior of a molecule of the nitrogen gas itself, an effect of a chemical action (for example, a catalytic reaction of nitrogen) contributes so that the above-mentioned high concentration ozone gas is generated. Based on this inference, Patent Document 5 explains a mechanism of generation of a high concentration ozone gas (addition of a nitrogen gas causes generation of a large amount of oxygen atoms because of a photochemical reaction between a small amount of an $NO_2$ gas and an NO gas that are generated during a discharge, resulting in generation of a high-concentration ozone gas). In the following, a slight mention will be made of the disclosure of Patent Document 5.

Patent Document 5 discloses such a mechanism that an ozone gas is generated due to a catalytic activity like a chemical reaction caused between a large amount of nitrogen gas itself contained in an oxygen gas and a discharge, based on the experimental fact that adding a large amount of nitrogen gas (for example, 1% (10000 ppm)) provides a high-concentration ozone gas of about 200 $g/m^3$ (160000 ppm) or more and the experimental fact that a high concentration ozone gas of 16 times or more is generated in accordance with the amount of an added nitrogen gas.

Patent Document 5 describes a chemical reaction in which an $NO_2$ gas is generated from a nitrogen gas as a result of the discharge, as follows.

That is, when an oxygen gas containing a nitrogen gas is supplied into a discharge space where a silent discharge is occurring, an $NO_2$ gas is generated based on the following Reaction Formulae 1 and 2. $N_2 + e \rightarrow 2N^+$ (the reaction of ionizing a nitrogen molecule; Reaction Formula 1). $2N^+ + O_2 + M \rightarrow\rightarrow NO_2$ (the reaction of generating $NO_2$; Reaction Formula 2). Based on these Reaction Formulae 1 and 2, an $NO_2$ gas of several ppm to several tens ppm is generated.

Moreover, Patent Document 5 discloses that: the $NO_2$ gas generated as a result of the reactions indicated by Reaction Formulae 1 and 2 causes a photodissociation reaction (a catalytic activity like a photochemical reaction) due to discharge light wavelength energy (hv), resulting in generation of an NO gas and an oxygen atom (O) (Reaction Formula 3); the generated NO gas causes an oxidation reaction with an oxygen molecule, resulting in generation of an oxygen atom (O) and an $NO_2$ gas (Reaction Formula 4); and Reaction Formula 3 and Reaction Formula 4 are alternately repeated, to thereby generate a large amount of oxygen atoms (O).

Here, Reaction Formula 3 is $NO_2 + hv \rightarrow NO + O$ (photodissociation reaction of $NO_2$), and Reaction Formula 4 is $NO + O_2$ (an oxygen gas that is a primary component of the raw material gas) $NO_2 + O$ (an oxidation reaction of NO).

In the technique according to Patent Document 5, when the amount of added nitrogen is 4% or more of the oxygen gas, the $NO_2$ gas of 400 ppm or more is generated as a result of the discharge, and this $NO_2$ gas reacts with oxygen (and generated ozone), so that a large amount of a nitrogen compound gas (NOx gas) such as an $N_2O_5$ gas is generated. As a result, as shown in the following Reaction Formula 5 rather than Reaction Formulae 3 and 4 that are the dissociation reaction into oxygen atoms, a chemical reaction between the generated ozone and NOx gas accounts for an increased percentage, which causes an ozonolysis reaction at an accelerated rate. Reaction Formula 5 is $O_3 + N_2O_5 \rightarrow 2O_2 + 2NO_2$ (decomposition of ozone due to impurities).

In this manner, in the technique according to Patent Document 5, when the amount of the nitrogen gas added to the raw material gas exceeds 4%, a large amount of NOx gas such as an $NO_2$ gas, which is a by-product caused by the discharge, is generated. This increases the percentage of the chemical reaction between the generated ozone gas and NOx gas, which promotes the action for decomposing the generated ozone gas, resulting in a failure to extract a high-concentration ozone gas.

As described above, Patent Document 5 discloses, instead of the ozone gas generation mechanism based on the theory of particle collisional dissociation, the ozone gas generation mechanism based on the catalytic activity like a chemical reaction (a large amount of dissociation into oxygen atoms is caused due to a photochemical reaction using the generated nitrogen compound gas and the discharge light, and the oxygen atoms obtained as a result of the dissociation are efficiently bound with oxygen molecules, so that a high-concentration ozone gas is generated).

FIG. 13 shows the relationship between the rate γ of nitrogen addition in the oxygen gas and the concentration of the ozone gas generated in the ozone generation apparatus 330. A result shown in FIG. 13 was obtained under conditions that, in the ozone generation apparatus 330 shown in FIG. 12, the short-gap discharge space was 0.1 mm and the gas pressure was 0.25 MPa, and a silent discharge was caused.

FIG. 13 reveals that, in the ozone generation apparatus 330 shown in FIG. 12, a decrease in the rate γ of nitrogen addition accordingly decreases the concentration of the generated ozone gas.

Accordingly, in order to suppress a decrease in the concentration of the generated ozone gas even when the amount of added nitrogen gas is reduced in the ozone generation apparatus 330, it is necessary to change the gap of the discharge space, the gas pressure, the area of the discharge surface, and the like (for example, an increase in the discharge surface area enables generation of an ozone gas having a higher concentration).

Here, even when the gap of the discharge space is changed in a range from 0.05 mm to several mm, the gas pressure is also changed, and/or the area of the discharge surface is also changed, the graph shown in FIG. 13 still has the same shape. Such changes merely cause the solid line graph shown in FIG. 13 to move up and down.

For example, in FIG. 13, when the rate of nitrogen addition is 10000 ppm, the concentration of the generated ozone gas is 290 $g/m^3$ (135000 ppm), and when the rate of nitrogen addition is 1 ppm, the concentration of the generated ozone gas is 40 $g/m^3$ (32000 PPM). Even if the gap of the discharge space, the gas pressure, the area of the discharge surface, and the like, are changed in the above-described manner, the concentration of the ozone gas generated when the rate of nitrogen addition is 10000 ppm and the concentration of the ozone gas generated when the rate of nitrogen addition is 1 ppm are increased and decreased, respectively, but, for example, the ratio of "(the concentration of the ozone gas generated when the rate of nitrogen addition is 10000 ppm)/(the concentration of the ozone gas generated when the rate of nitrogen addition is 1 ppm)" is unchanged.

Patent Document 6 shows an ozone generation apparatus that adopts an ozone gas generation method different from that of the ozone generation apparatus 330 shown in FIG. 12. Patent Document 6 discloses an ozone generation apparatus (called a nitrogen-free ozone generation apparatus) that generates a high-concentration ozone gas by using a raw material gas that contains only a high purity oxygen gas.

In the ozone generation apparatus according to Patent Document 6, a photocatalytic material is applied to a discharge surface facing a discharge space where a silent discharge occurs. When an AC voltage is applied to the oxygen gas supplied to the discharge space of the ozone generation apparatus and a silent discharge is caused, light having a wavelength of the visible light region (visible light of 428 nm to 620 nm) is emitted (discharged). The photocatalytic material absorbs the light having a wavelength of the visible light region which is emitted in the discharge. As a result, the discharge surface having the photocatalytic material, over which the gas passes, is excited, to exert a photocatalytic activity function. A photocatalytic effect of the photocatalytic material dissociates the oxygen gas in the discharge space. A chemical reaction between oxygen atoms obtained as a result of the dissociation and oxygen molecules contained in the oxygen gas generates a high-concentration ozone gas. Details of a mechanism and a configuration for generating a high-concentration ozone gas from a high-purity oxygen gas by using a photocatalytic material are known, as disclosed in Patent Document 6.

For example, in the field of semiconductor fabrication, the ozone gas generated in each of the above-described ozone generation apparatuses is used for an ozone treatment process such as formation of an ozone oxide insulating film and ozone washing, which is performed in a treatment apparatus provided separately from the ozone generation apparatus.

In the two different ozone gas generation apparatuses (the ozone generation apparatus 330 shown in FIG. 12 and the nitrogen-free ozone generation apparatus) described above, a voltage applied across electrodes that form the discharge space was applied in a stepwise manner, and a rise in the ozone concentration of the generated ozone in such a case was examined. A result thereof is shown in FIG. 14.

In FIG. 14, the broken line indicates ozone concentration rise characteristics obtained when a raw material gas containing a large amount of nitrogen gas added was supplied to the ozone generation apparatus shown in FIG. 12. In FIG. 14, the solid line indicates ozone concentration rise characteristics obtained when a raw material gas containing only a high-purity oxygen gas was supplied to the nitrogen-free ozone generation apparatus shown in FIG. 11 which will be described later.

As indicated by the solid line in FIG. 14, in the nitrogen-free ozone generation apparatus, when the voltage is applied stepwise, the ozone concentration promptly rises, and within about five seconds, reaches a steady-state concentration. On the other hand, in the ozone generation apparatus 330 shown in FIG. 12, when the voltage is applied stepwise, the ozone concentration rises after a delay of several seconds, gradually and asymptotically approaches a steady-state value, and about two to three minutes later, reaches a steady-state concentration.

Thus, the two ozone gas generation apparatuses described above exhibit different ozone concentration rise characteristics, and the difference in the ozone concentration rise characteristics is due to a difference in the mechanism for generating the ozone gas.

In the ozone generation apparatus 330 shown in FIG. 12, as seen from the ozone gas generation mechanism based on the Reaction Formula 1 to 4 mentioned above, generation of the $NO_2$ gas from the raw material gas containing a nitrogen gas added to an oxygen gas is once caused by the discharge, and then the ozone gas is generated by the catalytic activity. In this ozone gas generation mechanism, the rise in the ozone concentration is delayed when the stepwise voltage is applied as indicated by the broken line in FIG. 14.

On the other hand, in the nitrogen-free ozone generation apparatus, when the stepwise voltage is applied and the silent discharge is caused, the discharge light is immediately emitted. This discharge light promptly excites the photocatalytic material (reference numeral 303 in FIG. 11). This enables the photocatalytic effect to be immediately exerted, which can dissociate the supplied raw material gas (oxygen gas) into oxygen atoms due to the photocatalytic effect, so that the ozone gas is generated. This ozone gas generation mechanism of the nitrogen-free ozone generation apparatus enables the ozone concentration to promptly rise when the stepwise voltage is applied.

As thus far described, each of the ozone generate mechanisms has been demonstrated in the experiment shown in FIG. 14.

PRIOR-ART DOCUMENTS

Patent Documents

Patent Document 1: Japanese Patent Application Laid-Open No. 3-218905 (1991) (Japanese Priority Application No. 1-294926 (1989))
Patent Document 2: Japanese Patent Application Laid-Open No. 1-282104 (1989)
Patent Document 3: Japanese Patent Application Laid-Open No. 9-208202 (1997)
Patent Document 4: Japanese Patent Application Laid-Open No. 8-59213 (1996)
Patent Document 5: Japanese Patent Application Laid-Open No. 2004-359537
Patent Document 6: PCT International Publication No. 2005/080263

SUMMARY OF THE INVENTION

Problems to be Solved by the Invention

In the techniques according to the Patent Documents 1 to 4 described above, for improving the efficiency of ozone gas generation, a relatively large amount of nitrogen gas is added to the oxygen gas. However, adding a nitrogen gas to an oxygen gas causes a by-product such as NOx as well as the ozone gas to be simultaneously generated within the ozone generation apparatus.

When a predetermined process (such as a film formation process, an etching process, and an ozone washing process) is performed with use of the ozone gas generated in the ozone generation apparatus, the by-product causes an unintended reaction or the like during the predetermined process, which adversely affects the predetermined process (for example, a film containing a foreign substance is formed, and therefore an oxide insulating film formed by using the ozone gas has a deteriorated insulation performance). Moreover, the by-product is a cause of corrosion within the ozone generation apparatus and corrosion within an ozone treatment apparatus such as a CVD apparatus and in peripheral apparatuses. Such corrosions result in deterioration in the performance of the ozone treatment system itself, which shortens the lifetime of the ozone treatment system.

Generation of the by-product can be prevented when the raw material gas does not contain a nitrogen gas. However, not adding any nitrogen gas to the raw material gas in the ozone generation apparatuses disclosed in the cited documents 1 to 4 leads to a lower concentration of the generated ozone gas, because the catalytic activity of the nitrogen gas shown in cited document 5 is not provided.

On the other hand, Patent Document 6 described above discloses one of ozone generation apparatuses (so-called, nitrogen-free ozone generation apparatuses) that are able to generate a high concentration ozone gas by using a raw material gas containing no nitrogen gas added (that is, only the high-concentration oxygen gas).

However, it has been revealed that, in practical use of the ozone generation apparatus according to the cited document 6, the discharge light generated with use of the raw material gas containing only the high-purity oxygen gas causes the following problem. Since a minute amount of impurity gas changes the intensity and wavelength of the discharge light, unevenness occurs in the photocatalytic effect of the photocatalytic material. The unevenness of the photocatalytic effect may cause a large variation in the concentration of the generated ozone.

Therefore, an object of the present invention is to provide a low-cost ozone generation system that enables suppression of generation of a by-product. More preferably, an object of the present invention is to provide an ozone generation system that enables generation of a stable ozone gas with less unevenness. Further preferably, an object of the present invention is to provide an ozone generation system that enables stable generation of an ozone gas with a high concentration and a high quality.

Means for Solving the Problems

An ozone generation system according to the present invention includes: an oxygen supply port; a nitrogen supply port; an ozone generation apparatus that generates ozone from an inflowing raw material gas; and a gas flow rate adjustment apparatus configured such that oxygen supplied from the oxygen supply port and nitrogen supplied from the nitrogen supply port flow into the gas flow rate adjustment apparatus, and the gas flow rate adjustment apparatus adjusts the flow rates of the oxygen and the nitrogen and, after the adjustment, outputs the oxygen and the nitrogen, serving as the raw material gas, to the ozone generation apparatus. The gas flow rate adjustment apparatus includes: a first oxygen flow rate adjustment part connected to the oxygen supply port, and configured to adjust the flow rate of the oxygen supplied from the oxygen supply port; a second oxygen flow rate adjustment part connected to the oxygen supply port, and configured to adjust the flow rate of the oxygen supplied from the oxygen supply port; a nitrogen flow rate adjustment part connected to the nitrogen supply port, and configured to adjust the flow rate of the nitrogen supplied from the nitrogen supply port; and a mixed gas flow rate adjustment part configured to adjust the flow rate of a first mixed gas including the oxygen outputted from the second oxygen flow rate adjustment part and the nitrogen outputted from the nitrogen flow rate adjustment part. The gas flow rate adjustment apparatus is configured to output a second mixed gas, serving as the raw material gas, to the ozone generation apparatus, the second mixed gas including the oxygen outputted from the first oxygen flow rate adjustment part and the first mixed gas outputted from the mixed gas flow rate adjustment part. The gas flow rate adjustment apparatus is configured to generate the second mixed gas such that the second mixed gas contains the nitrogen added to the oxygen with the rate of addition of the nitrogen being set in a range of more than 0 PPM and not more than 100 PPM, by using the first oxygen flow rate adjustment part, the second oxygen flow rate adjustment part, the nitrogen flow rate adjustment part, and the mixed gas flow rate adjustment part.

Effects of the Invention

The ozone generation system according to the present invention is able to suppress generation of a by-product while suppressing a decrease in the amount of generated ozone gas and suppressing a range of fluctuation. Since generation of the by-product is suppressed, an excellent performance of a thin film can be obtained as a result of an ozone treatment using the generated high-quality ozone gas, and additionally corrosion caused by the by-product within the apparatus can be suppressed. Moreover, through a plurality of flow rate adjustment parts, the raw material gas with the rate γ of nitrogen addition (more than zero and not more than 100 PPM) is stably generated. Thus, minute adjustment of the gas flow rate is not necessary in the nitrogen flow rate adjustment part. This can reduce the cost of the nitrogen flow rate adjustment part, which consequently achieves a cost reduction of the ozone generation system as a whole.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 A diagram showing the relationship between the rate of nitrogen addition and the amount of contamination (the amount of metal contamination) occurring in a film in a case where a film formation process is performed by using a generated ozone gas.

FIG. 2 A diagram showing the relationship between the rate of nitrogen addition and the amount of generated by-product in a case where the film formation process is performed by using the generated ozone gas.

FIG. 4 A diagram showing a flow of a flow rate adjustment operation (nitrogen addition rate γ adjustment operation) in the ozone generation system 100.

FIG. 6 A diagram showing a flow of a flow rate adjustment operation (nitrogen addition rate γ adjustment operation) in the ozone generation system 200.

EMBODIMENT FOR CARRYING OUT THE INVENTION

Figure 3:
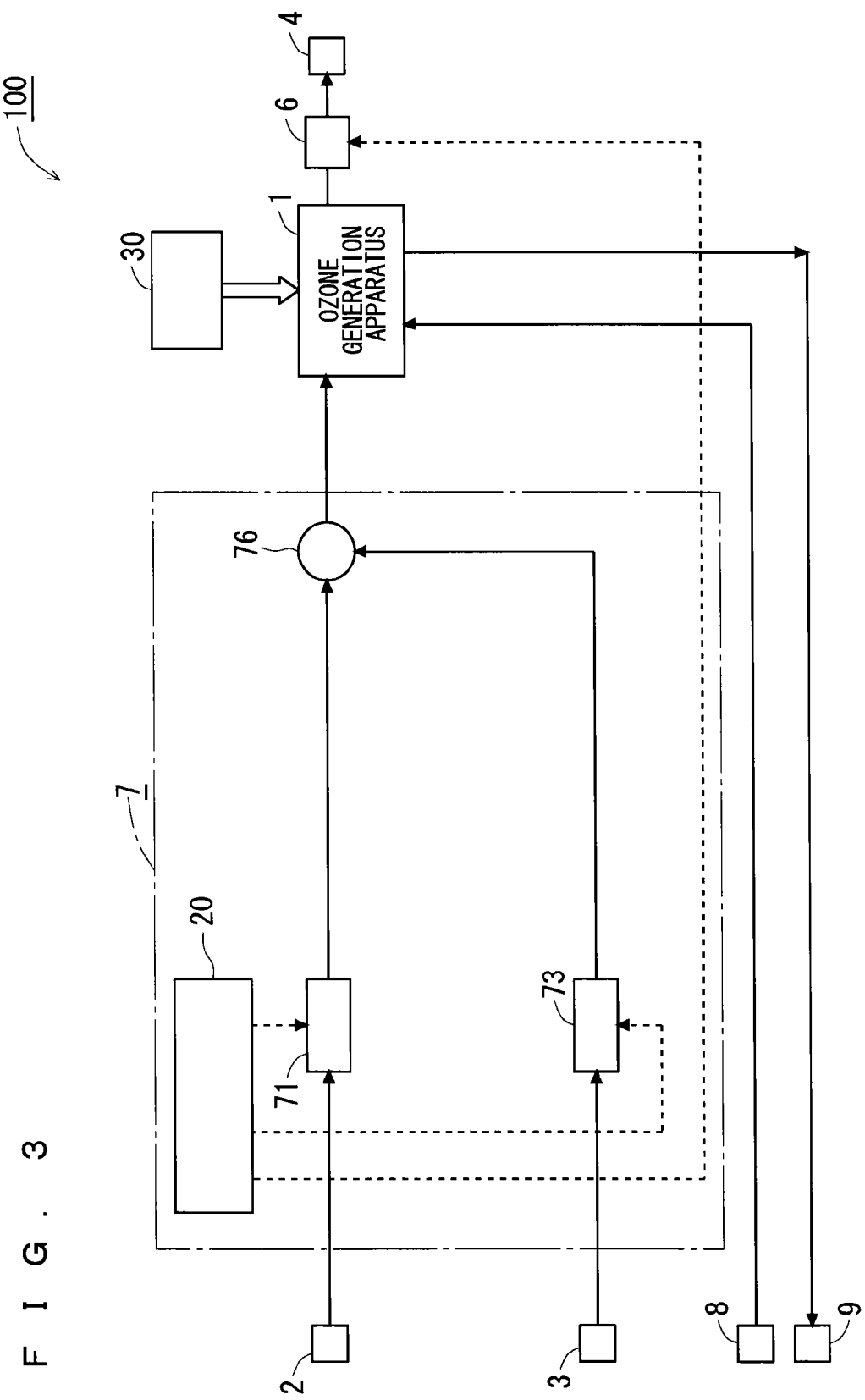
FIG. 3 A block diagram showing a configuration of an ozone generation system 100 according to the present invention.

As described above, in an ozone generation apparatus (nitrogen-gas-added type ozone apparatus 330) other than a nitrogen-free ozone generation apparatus, from the viewpoint of improving the efficiency of ozone gas generation, it is preferable that a large amount of nitrogen gas is added to a raw material gas. In the following description, an ozone generation apparatus other than the nitrogen-free ozone generation apparatus will be simply referred to as an ozone generation apparatus.

However, adding a large amount of nitrogen gas to the raw material gas causes generation of a large amount of by-product, resulting in generation of an ozone gas having a large amount of metal contamination (that is, the quality of a generated ozone gas decreases). Therefore, it has been demanded to provide an ozone generation system that is able to control and suppress generation of a by-product to a constant amount while maintaining a certain level of improvement in the efficiency of ozone gas generation. The inventors have conducted experiments, observations, and the like, and obtained the following experimental results.

FIG. 1 illustrates an experimental result showing the relationship between the rate of nitrogen addition and the amount of metal contamination (the amount of metal contamination) in a wafer having an ozone treatment performed thereon. In FIG. 1, the vertical axis represents the amount of metal contamination (/cm$^2$), and the horizontal axis represents the rate γ of nitrogen addition (PPM), which is the ratio of added nitrogen to oxygen.

In the experiment of FIG. 1, a raw material gas in which a nitrogen gas having a high purity (99.99% or more) was added to an oxygen gas having a high purity (99.99% or more) was supplied to an ozone generation apparatus, then an ozone gas was generated from the raw material gas within the ozone generation apparatus, and then the ozone gas was sprayed to a wafer surface for several minutes, so that an insulating film was formed on the wafer surface. In the experiment of FIG. 1, the rate γ of nitrogen addition in the raw material gas was changed, and the amount of metal contamination in an insulating film formed with each of the rates γ of nitrogen addition was measured.

Obviously, FIG. 1 reveals that the amount of metal contamination is correlated with the rate γ of nitrogen addition in the raw material gas. More specifically, a decrease in the rate γ of addition of the nitrogen gas in the raw material gas results in a decrease in the amount of metal contamination on the wafer surface.

Based on the performance of a formed thin film, it has been found that a certain level of allowable range of the amount of metal contamination adhering to the wafer surface is within a region 999 shown in FIG. 1 (such a range that the amount of metal contamination is not more than about 3.0×10$^9$/cm$^2$, in which there is a little fear that the metal contamination may deteriorate the insulation performance; this range will be called a quasi-allowable range).

Based on the performance of the formed thin film, an allowable range of the amount of metal contamination adhering to the wafer surface having the ozone treatment performed thereon is within a region 99 shown in FIG. 1 (such a range that the amount of metal contamination is not more than about 1.0×10$^9$/cm$^2$, in which the deterioration in the insulation performance due to the metal contamination is completely negligible; this range will be called an allowable range).

In the same experiment as shown in FIG. 1, the amount of by-product (NOx) contain in a gas outputted from the ozone generation apparatus was measured relative to each of the rate γ of nitrogen addition in the raw material gas. A result of the measurement is shown in FIG. 2. In FIG. 2, the vertical axis represents the rate of generation of the by-product (NOx) (PPM) relative to the generated ozone gas, and the horizontal axis represents the rate γ of nitrogen addition (PPM), which is the ratio of added nitrogen to oxygen.

Obviously, FIG. 2 reveals that the rate of generation of the by-product (NOx) is correlated with the rate γ of nitrogen addition in the raw material gas. More specifically, a decrease in the rate of addition of the nitrogen gas in the raw material gas results in a decrease in the amount of by-product (NOx) contained in the ozone gas.

Through the experiments shown in FIGS. 1 and 2, it has been revealed that, in order to obtain a good performance of the thin film (in order to control and suppress a bad influence of the contamination contained in the ozone gas to a constant amount), it is desirable that the rate of generation of the by-product (NOx) is suppressed to not more than 0.01 ppm and controlled to a constant amount. Moreover, it has been also revealed that suppressing the rate of generation of the by-product (NOx) to not more than 0.01 ppm enables suppression of corrosion which is caused by the by-product within the apparatus.

In order to generate a larger amount of ozone gas in the ozone generation apparatus and output an ozone gas with less fluctuation, it is preferable to adopt, instead of a raw material gas containing only a high-purity oxygen gas, a high-quality raw material gas containing any, even a little, nitrogen gas added to a high-purity oxygen gas with the amount of the addition being controlled to a constant amount.

Accordingly, from the experimental results of FIGS. 1 and 2, for example, the following is revealed. That is, in order to obtain an excellent performance of the thin film as a result of the ozone treatment using the generated ozone gas with suppression of a decrease in the amount of generated ozone and also in order to suppress corrosion caused by the by-product within the apparatus, it is necessary that the rate γ of addition of a high-concentration nitrogen gas contained in the raw material gas whose primary component is a high-purity oxygen gas is more than zero and not more than 100 PPM (0≤γ≤100 PPM).

To stably perform the ozone treatment, it is necessary that the generated ozone has a stable concentration (that is, a raw material gas having a high quality described above is necessary). Thus, in order to obtain an excellent performance of the thin film as a result of the ozone treatment using the generated ozone gas with suppression of a decrease in the amount of generated ozone, to suppress corrosion caused by the by-product within the apparatus, and also to stably perform the ozone generation in the ozone generation apparatus (to generate a high-quality ozone gas having a constant concentration), it is desirable that the rate γ of nitrogen addition is set to be a constant value in a range of 0≤γ≤100 PPM.

As thus far described, in order to obtain an excellent performance of the thin film as a result of the ozone treatment using the generated ozone gas with suppression of a decrease in the amount of generated ozone gas, to enable stable generation of the ozone gas, and to suppress corrosion caused by the by-product within the apparatus, it is important that the rate γ of nitrogen addition, which is the rate of addition of a high-concentration nitrogen gas contained in the raw material gas whose primary component is a high-purity oxygen gas, is set to be a constant value in a range of more than zero and not more than 100 PPM and that the raw material gas containing such a constant amount of nitrogen gas is continuously supplied to the ozone generation apparatus.

FIG. 3 illustrates one conceivable example of an ozone generation system including a gas flow rate adjustment apparatus that is able to supply the raw material gas having nitrogen added thereto under the above-described conditions to the ozone generation apparatus. FIG. 3 is a block diagram showing an outline configuration of an ozone generation system 100.

As shown in FIG. 3, the ozone generation system 100 includes an oxygen supply port 2, a nitrogen supply port 3, a gas flow rate adjustment apparatus 7, and an ozone generation apparatus 1.

A power supply device 30 is connected to the ozone generation apparatus 1. The power supply device 30 applies a voltage between electrodes in the ozone generation apparatus 1 for causing a silent discharge (dielectric material barrier discharge). Also, for cooling the electrodes and the like that are heated by the discharge, a cooling medium is supplied from a cooling medium supply port 8 to the ozone generation apparatus 1. The cooling medium having served for the cooling within the ozone generation apparatus 1 is outputted from the ozone generation apparatus 1 toward a cooling medium outlet 9.

As shown in FIG. 3, an oxygen flow rate adjustment part 71, a nitrogen flow rate adjustment part 73, a gas mixer 76, and a control part 20 are arranged in the gas flow rate adjustment apparatus 7.

The oxygen flow rate adjustment part 71 is a mass flow rate controller (MFC), and, under control by the control part 20, adjusts the flow rate of an oxygen gas having a high purity (99.99% or more) that is supplied from the oxygen supply port 2 and outputs the oxygen gas thus adjusted to the gas mixer 76. Here, the oxygen flow rate adjustment part 71 controls the flow rate of the high-purity oxygen gas to be a value in a range of 1 to 20 SLM.

The nitrogen flow rate adjustment part 73 is a mass flow rate controller (MFC), and, under control by the control part 20, adjusts the flow rate of a nitrogen gas having a high purity (99.99% or more) that is supplied from the nitrogen supply port 3 and outputs the nitrogen gas thus adjusted to the gas mixer 76. Here, the nitrogen flow rate adjustment part 73 controls the flow rate of the nitrogen gas to be a value in a range of 0.01 to 2 SCCM.

The control part 20 is also able to control the pressure of a pressure adjustor 6. The pressure adjustor 6 adjusts the pressure within the ozone generation apparatus 1 to be a desired value. The pressure adjustor 6 is an automatic pressure controller (APC).

The gas mixer 76 mixes the oxygen gas outputted from the oxygen flow rate adjustment part 71 with the nitrogen gas outputted from the nitrogen flow rate adjustor 73, to generate the raw material gas. Since the oxygen flow rate adjustment part 71 adjusts the flow rate of the oxygen gas within the above-described flow rate adjustment range and the nitrogen flow rate adjustor 73 adjusts the flow rate of the nitrogen gas within the above-described flow rate adjustment range, the following raw material gas is generated. That is, a raw material gas containing the nitrogen gas added to the oxygen gas with the rate of nitrogen addition being more than zero and not more than 100 PPM (more preferably, 10 PPM or more and 100 PPM or less) is generated.

The reason why it is preferable that the lower limit of the rate of nitrogen addition is 10 PPM is that a nitrogen gas less than 10 PPM is difficult to be adjusted in its flow rate and to be constantly supplied, from the viewpoint of the performance of a flow rate adjustor and an increase in the price of the flow rate adjustor. In other words, an MFC that is currently commercially available does not guarantee the accuracy of a minute adjustment of the flow rate of the nitrogen gas less than 10 PPM. The flow rate of the nitrogen gas slightly fluctuates, and it is generally difficult to always control the flow rate of the nitrogen gas to a constant minute value.

The raw material gas is supplied into the ozone generation apparatus 1 from the gas mixer 76 of the gas flow rate adjustment apparatus 7. In the ozone generation apparatus 1, a silent discharge is caused on the raw material gas, to generate the ozone gas due to a photochemical reaction of the silent discharge. The generated ozone gas is outputted through the ozone gas outlet 4 into an ozone treatment apparatus, such as a CVD apparatus, that performs a desired ozone treatment using the ozone gas.

FIG. 4 is a diagram showing an operation of the control part 20.

The user firstly sets, on the control part 20, an oxygen gas flow rate value Q0 (SLM), the rate γ of nitrogen addition (PPM), and a pressure value $P_G$ (MPa) within the ozone generation apparatus 1 (step S1). This causes the control part 20 to obtain a nitrogen gas flow rate value Qx (SCCM) based on Qx=γ×Q0 (step S2).

Here, the oxygen gas flow rate value Q0 is set within a range of 1 SLM to 20 SLM, and the rate γ of nitrogen addition is set within a range of 0≤γ≤100 PPM (more preferably, 10 PPM≤γ≤100 PPM).

Then, the control part 20 outputs, as a control value, the oxygen gas flow rate value Q0 that has been set in step S1, to the oxygen flow rate adjustment part 71 (step S3). The control part 20 also outputs, as a control value, the pressure value $P_G$ that has been set in step S1, to the pressure adjustor 6 (step S3). Furthermore, the control part 20 outputs, as a control value, the nitrogen gas flow rate value Qx that has been calculated in step S2, to the nitrogen flow rate adjustment part 73 (step S3).

The transmission of the control values from the control part 20 to the oxygen flow rate adjustment part 71 and the nitrogen flow rate adjustment part 73 causes the gas mixer 76 to generate a raw material gas containing the nitrogen gas added to the oxygen gas with the rate γ of nitrogen addition that has been set in step S1. When the control values Q0 and Qx are constant, the oxygen flow rate adjustment part 71 which is an MFC keeps the oxygen gas flow rate value Q0 constant while the nitrogen flow rate adjustment part 73 which is an MFC keeps the nitrogen gas flow rate value Qx constant. That is, the rate γ of nitrogen addition in the raw material gas is also constant. The above-mentioned transmission of the control value to the pressure adjustor 6 causes the pressure within the ozone generation apparatus 1 to be kept at $P_G$ (MPa).

The ozone generation system 100 includes the gas flow rate adjustment apparatus 7 having the above-described configuration and operation. Accordingly, the raw material gas containing nitrogen added to the high-purity oxygen gas with the rate γ of nitrogen addition being a constant value in a range of more than zero and not more than 100 PPM, can be continuously supplied to the ozone generation apparatus 1.

In the above-described ozone generation system 100 as well, it is possible to continuously supply, to the ozone generation apparatus 1, the raw material gas containing nitrogen added to the high purity oxygen with the rate γ of nitrogen addition being a constant value in a range of more than zero and not more than 100 PPM. In this case, it is necessary that the nitrogen flow rate adjustment part 73 adopts a MFC that is able to control the flow rate in a range of 0.01 SCCM to 2 SCCM. Such a MFC is very expensive, and increases the cost of the ozone generation system 100.

Therefore, the following embodiments will describe a low-cost ozone generation system that is able to continuously supply, to the ozone generation apparatus 1, the raw material gas containing nitrogen added to the high-purity oxygen gas with the rate γ of nitrogen addition being a constant value in a range of more than zero and not more than 100 PPM.

Embodiment 1

Figure 5:
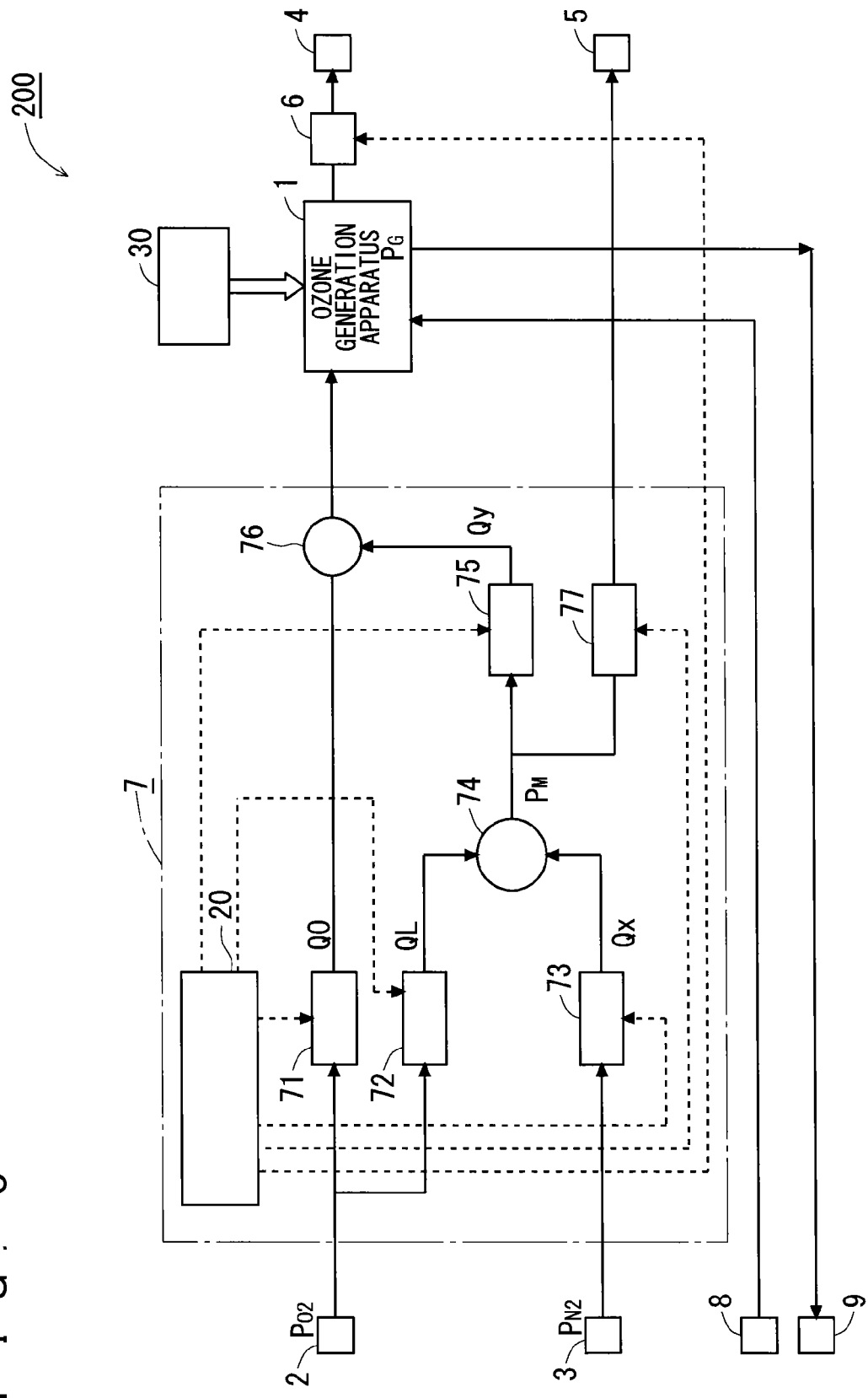
FIG. 5 A block diagram showing a configuration of an ozone generation system 200 according to an embodiment 1.

FIG. 5 is a block diagram showing an outline configuration of an ozone generation system 200 according to this embodiment.

As shown in FIG. 5, the ozone generation system 200 includes an oxygen supply port 2, a nitrogen supply port 3, a gas flow rate adjustment apparatus 7, and an ozone generation apparatus 1.

An oxygen gas having a high purity (99.99% or more) is supplied from the oxygen supply port 2. The nitrogen supply port 3 is provided separately from the oxygen supply port 2.

A nitrogen gas having a high purity (99.99% or more) is supplied from the nitrogen supply port 3. Thus, a configuration for actively supplying a nitrogen gas is arranged.

A power supply device 30 is connected to the ozone generation apparatus 1. The power supply device 30 applies a voltage between electrodes in the ozone generation apparatus 1 for causing a silent discharge (dielectric material barrier discharge). The ozone generation apparatus 1 causes a silent discharge on the raw material gas that is supplied from the gas flow rate adjustment apparatus 7, to generate the ozone gas due to a photochemical reaction of the silent discharge. Also, for cooling the electrodes and the like that are heated by the discharge, a cooling medium is supplied from a cooling medium supply port 8 to the ozone generation apparatus 1. The cooling medium having served for the cooling within the ozone generation apparatus 1 is outputted from the ozone generation apparatus 1 toward a cooling medium outlet 9.

The raw material gas is supplied into the ozone generation apparatus 1 from a second gas mixer 76 of the gas flow rate adjustment apparatus 7. As described above, in the ozone generation apparatus 1, a silent discharge is caused on the raw material gas, to generate the ozone gas due to a photochemical reaction of the silent discharge. The generated ozone gas is outputted through the ozone gas outlet 4 into an ozone treatment apparatus, such as a CVD apparatus, that performs a desired ozone treatment using the ozone gas.

The oxygen gas supplied from the oxygen supply port 2 and the nitrogen gas supplied from the nitrogen supply port 3 flows into the gas flow rate adjustment apparatus 7. The gas flow rate adjustment apparatus 7 adjusts each of the flow rate of the oxygen gas and the flow rate of the nitrogen gas. The gas flow rate adjustment apparatus 7 mixes the oxygen gas obtained through the flow rate adjustment with the nitrogen gas obtained through the flow rate adjustment, and outputs a resultant, as the raw material gas, to the ozone generation apparatus 1.

As shown in FIG. 5, in the gas flow rate adjustment apparatus 7 according to this embodiment, a first oxygen flow rate adjustment part 71, a second oxygen flow rate adjustment part 72, a nitrogen flow rate adjustment part 73, a first gas mixer 74, a mixed gas flow rate adjustment part 75, a second gas mixer 76, a first mixed gas pressure adjustor 77, and a control part 20, are arranged.

The first oxygen flow rate adjustment part 71 is a mass flow rate controller (MFC). The gas inflow side of the first oxygen flow rate adjustment part 71 is connected to the gas outflow side of the oxygen supply port 2. The gas outflow side of the first oxygen flow rate adjustment part 71 is connected to the gas inflow side of the second gas mixer 76. The first oxygen flow rate adjustment part 71 is communicably connected to the control part 20.

Under control by the control part 20, the first oxygen flow rate adjustment part 71 adjusts the flow rate of the oxygen gas that is supplied from the oxygen supply port 2, and outputs the oxygen gas obtained through the flow rate adjustment to the second gas mixer 76. The first oxygen flow rate adjustment part 71 controls and adjusts the oxygen gas flow rate Q0 within a range of 1 SLM to 20 SLM.

The second oxygen flow rate adjustment part 72 is a mass flow rate controller (MFC). The gas inflow side of the second oxygen flow rate adjustment part 72 is connected to the gas outflow side of the oxygen supply port 2. The gas outflow side of the second oxygen flow rate adjustment part 72 is connected to the gas inflow side of the first gas mixer 74. The second oxygen flow rate adjustment part 72 is communicably connected to the control part 20.

Under control by the control part 20, the second oxygen flow rate adjustment part 72 adjusts the flow rate of the oxygen gas that is supplied from the oxygen supply port 2, and outputs the oxygen gas obtained through the flow rate adjustment to the first gas mixer 74. The second oxygen flow rate adjustment part 72 controls and adjusts the oxygen gas flow rate within a range of "oxygen flow rate QL" shown in FIG. 8 which will be described later.

The nitrogen flow rate adjustment part 73 is a mass flow rate controller (MFC). The gas inflow side of the nitrogen flow rate adjustment part 73 is connected to the gas outflow side of the nitrogen supply port 3. The gas outflow side of the nitrogen flow rate adjustment part 73 is connected to the gas inflow side of the first gas mixer 74. The nitrogen flow rate adjustment part 73 is communicably connected to the control part 20.

Under control by the control part 20, the nitrogen flow rate adjustment part 73 adjusts the flow rate of the nitrogen gas that is supplied from the nitrogen supply port 3, and outputs the nitrogen gas obtained through the flow rate adjustment to the first gas mixer 74. The nitrogen flow rate adjustment part 73 controls and adjusts the nitrogen gas flow rate Qx within a range of more than zero and not more than 10 SCCM.

The mixed gas flow rate adjustment part 75 is a mass flow rate controller (MFC). The gas inflow side of the mixed gas flow rate adjustment part 75 is connected to the gas outflow side of the first gas mixer 74. The gas outflow side of the mixed gas flow rate adjustment part 75 is connected to the gas inflow side of the second gas mixer 76. The mixed gas flow rate adjustment part 75 is communicably connected to the control part 20.

Under control by the control part 20, the mixed gas flow rate adjustment part 75 adjusts the flow rate of a first mixed gas that is outputted from the first gas mixer 74, and outputs the first mixed gas obtained through the flow rate adjustment to the second gas mixer 76. The mixed gas flow rate adjustment part 75 controls and adjusts the flow rate Qy of the first mixed gas within a range of more than zero and not more than 100 SCCM.

As seen from the description above, the first gas mixer 74 performs a process for mixing the oxygen gas obtained through the flow rate adjustment with the nitrogen gas obtained through the flow rate adjustment, to generate the first mixed gas, and outputs the generated first mixed gas. The second gas mixer 76 performs a process for mixing the oxygen gas obtained through the flow rate adjustment with the first mixed gas obtained through the flow rate adjustment, to generate a second mixed gas (raw material gas), and outputs the generated second mixed gas (raw material gas).

The raw material gas outputted from the second gas mixer 76 contains nitrogen added to the high-purity oxygen gas. The flow rate of this nitrogen is controlled to a constant value. The rate of nitrogen addition is set to be more than zero and not more than 100 PPM (more preferably, 10 PPM or more and 100 PPM or less).

The first mixed gas pressure adjustor 77 is an automatic pressure controller (APC), and connected between the first mixer 74 and the mixed gas flow rate adjustment part 75 (connected to the output side of the first gas mixer 74). The first mixed gas pressure adjustor 77 is communicably connected to the control part 20.

Under control by the control part 20, the first mixed gas pressure adjustor 77 adjusts the pressure of the first mixed gas that is outputted from the first gas mixer 74.

The flow rate of the gas that flows into the first mixer 74 is equal to QL (the oxygen gas flow rate adjusted by the second oxygen flow rate adjustment part 72)+Qx (the nitrogen gas flow rate adjusted by the nitrogen flow rate adjustment part 73). The flow rate Qy of the gas that flows out of the mixed gas flow rate adjustment part 75 is a part of the (QL+Qx). In a case where the gas having a gas flow rate of (QL+Qx−Qy) is not discharged from the gas discharge port 5 with use of the first mixed gas pressure adjustor 77, pressure $P_M$ at the output side of the first mixer 74 rises more and more.

As a result, the above-mentioned pressure $P_M$ rises up to a value equal to or more than gas pressure $P_{O2}$ in the oxygen supply port 2 or gas pressure $P_{N2}$ in the nitrogen supply port 3. Under such a state, a gas flow from the oxygen supply port 2 toward the second oxygen flow rate adjustment part 72 or a gas flow from the nitrogen supply port 3 toward the nitrogen flow rate adjustment part 73 is hindered.

Therefore, in order that the gas can flow into the gas flow rate adjustment apparatus 7 from the oxygen supply port 2 and the nitrogen supply port 3, then normally flow through the gas flow rate adjustment apparatus 7, and then be normally supplied into the ozone generation apparatus 1 from the gas flow rate adjustment apparatus 7 (in other words, in order to maintain the flow indicated by the reference numerals 2→72→74→75→76→1 and the flow indicated by the reference numerals 3→73→74→75→76→1), a pressure condition of $P_{O2}$, $P_{N2} > P_M > P_G$ (the pressure within the ozone generation apparatus 1) is required.

Accordingly, under control by the control part 20, a valve provided within the first mixed gas pressure adjustor 77 automatically makes adjustment so as to satisfy the above-mentioned pressure condition and so as to keep the pressure value $P_M$ at the output side of the first gas mixer 74 constant. In the adjustment, part of the first mixed gas (part of the first mixed gas not used as the raw material gas) is discharged through the gas discharge port 5.

The control part 20 is also communicably connected to the pressure adjustor 6 provided outside the gas flow rate adjustment apparatus 7. The pressure adjustor 6 is an automatic pressure controller (APC), and connected to the ozone generation apparatus 1. Accordingly, the control part 20 is able to control the pressure of the pressure adjustor 6, too. The pressure adjustor 6 adjusts the pressure within the ozone generation apparatus 1 to be a desired pressure value $P_G$.

Next, with reference to a flow shown in FIG. 6, a description will be given to an operation of the control part 20 (that is, an operation for generating the raw material gas containing nitrogen added to the high-purity oxygen gas with the flow rate of the nitrogen being controlled to a constant value and with the rate of nitrogen addition being more than zero and not more than 100 PPM (more preferably, 10 PPM or more and 100 PPM or less)).

The user firstly sets, on the control part 20, the oxygen gas flow rate value Q0 (SLM) in the first oxygen flow rate adjustment part 71, the nitrogen gas flow rate value Qx (SCCM) in the nitrogen flow rate adjustment part 73, the rate γ of nitrogen addition (PPM), the pressure value within the ozone generation apparatus 1 (that is, a control pressure value to be transmitted to the pressure adjustor 6) $P_G$ (MPa), and the pressure value of the first mixed gas (that is, a control pressure value to be transmitted to the first mixed gas pressure adjustor 77) $P_M$ (step S11).

Here, the oxygen gas flow rate value Q0 is set within a range of, for example, 1 SLM to 20 SLM. The nitrogen gas flow rate value Qx is set within a range of more than zero and not more than 10 SCCM. The rate γ of nitrogen addition is set within a range of 0<γ≤100 PPM (more preferably, 10 PPM≤γ≤100 PPM). The pressure value $P_M$ is set within a range of greater than the pressure values $P_{O2}$, $P_{N2}$ and less than the pressure value $P_G$. The oxygen gas pressure $P_{O2}$ in the oxygen supply port 2 and the nitrogen gas pressure $P_{N2}$ in the nitrogen supply port 3 are already known.

Then, the control part 20 calculates the first mixed gas flow rate value Qy in the mixed gas flow rate adjustment part 75 by using first data that is preliminarily set in the control part 20 and the set values that have been set in step S11 (step S12).

Here, a proportional relationship expression (Qy=α×Q0×1000) is adopted as the first data that is preliminarily set in the control part 20. Determining the first mixed gas flow rate Qy such that this proportional relationship expression is established relative to the oxygen gas flow rate value Q0, enables the ratio α of the first mixed gas added to the high-purity oxygen gas that is outputted from the first oxygen flow rate adjustment part 71 to be kept constant even when the oxygen gas gas flow rate Q0 is varied.

Figure 7:
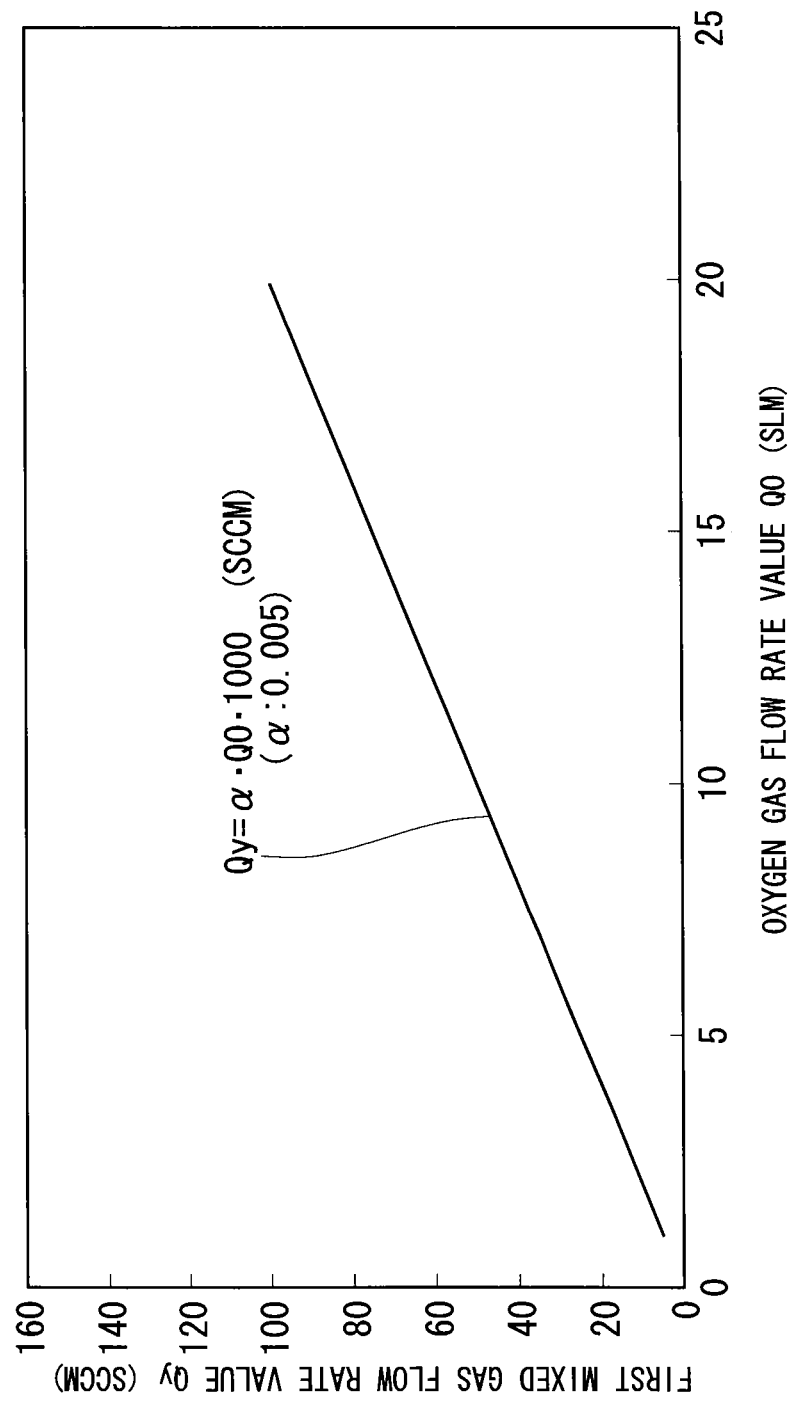
FIG. 7 A diagram graphically showing the relational expression for obtaining a first mixed gas flow rate value Qy.

FIG. 7 is a diagram graphically showing the proportional relationship expression mentioned above. In FIG. 7, the vertical axis represents the first mixed gas flow rate value Qy (SCCM), and the horizontal axis represents the oxygen gas flow rate value Q0 (SLM). In the proportional relationship expression of FIG. 7, α represents a constant value within a range of 0.01 to 0.001. In the proportional relationship expression illustrated in FIG. 7, α=0.005 is adopted as an example.

Thus, in step S12, the control part 20 obtains the first mixed gas flow rate Qy by using the first data indicating the proportional relationship expression (Qy=α×Q0×1000) and the oxygen gas flow rate value Q0 that has been set in step S11.

Then, the control part 20 calculates an oxygen gas flow rate value QL in the second oxygen flow rate adjustment part 72 by using second data that is preliminarily set in the control part 20 and the set values that have been set in step S11 (step S13).

Here, a relational expression (QL=F{α,γ,Qx}) is adopted as the second data that is preliminarily set in the control part 20. In the function F, γ is the γ included in the above-mentioned proportional relationship expression (in other words, the ratio of the first mixed gas added to the second mixed gas). In the function F, γ represents the rate γ of nitrogen addition that has been set in step S11. In the function F, Qx represents the nitrogen gas flow rate value Qx that has been set in step S11. The rate γ of nitrogen addition is (β·α)×10^6 (PPM), and β represents the ratio of the nitrogen gas added to the first mixed gas.

Figure 8:
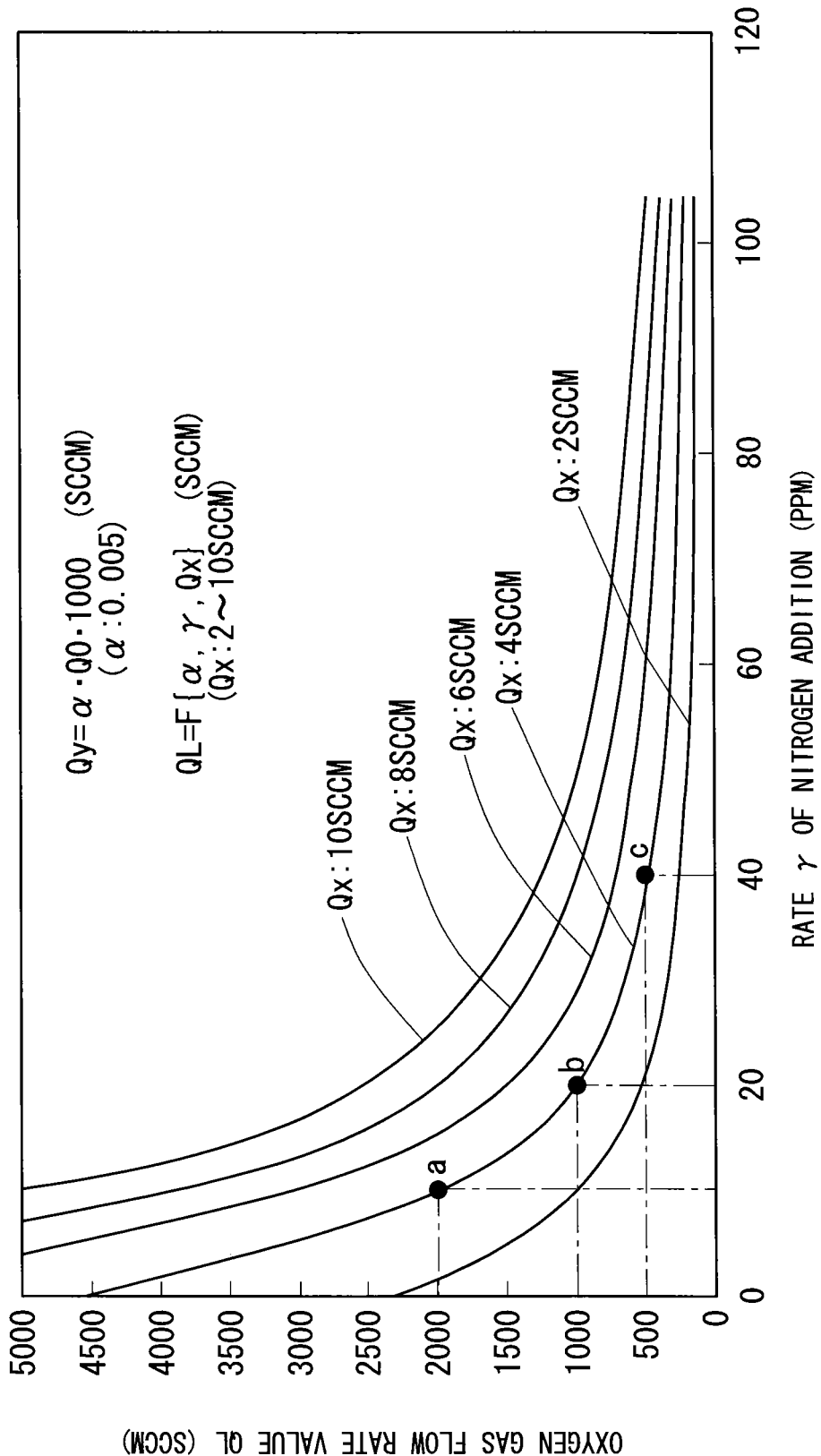
FIG. 8 A diagram graphically showing the relational expression for obtaining an oxygen gas flow rate value QL.

FIG. 8 is a diagram graphically showing the relational expression F. In FIG. 8, the vertical axis represents the oxygen gas flow rate value QL (SCCM), and the horizontal axis represents the rate γ of nitrogen addition (PPM). In the relational expression F illustrated in FIG. 8, α represents a constant value within a range of 0.01 to 0.001. In the relational expression illustrated in FIG. 8, α=0.005 is adopted as an example. In the relational expression F illustrated in FIG. 8 as well, the proportional relationship expression shown in FIG. 7 is used.

FIG. 8 shows a graph in a case where the nitrogen gas flow rate Qx that has been set in step S11 is 2 SCCM; a graph in a case where the nitrogen gas flow rate Qx that has been set in step S11 is 4 SCCM; a graph in a case where the nitrogen gas flow rate Qx that has been set in step S11 is 6 SCCM; a graph in a case where the nitrogen gas flow rate Qx that has been set in step S11 is 8 SCCM; and a graph in a case where the nitrogen gas flow rate Qx that has been set in step S11 is 10 SCCM.

Thus, in step S13, the control part 20 obtains the oxygen gas flow rate QL by using the second data indicating the relational expression (QL=F{α,γ,Qx}), the nitrogen gas flow rate Qx that has been set in step S11, the rate γ of nitrogen addition that has been set in step S11, the first data and the like used in step S12 (for example, "α" included in the above-mentioned proportional relationship expression).

In the example shown in FIG. 8, with α=0.005, the first data (the above-mentioned proportional relationship expression) is set, and the nitrogen gas flow rate Qx is set to be 4 SCCM in step S11. Under this condition, in a case where the rate γ of nitrogen addition has been set to be 10 PPM in step S11, the control part 20 calculates 2000 SCCM as the oxygen gas flow rate QL (the point a in FIG. 8). In a case where the rate γ of nitrogen addition has been set to be 20 PPM in step S11, the control part 20 calculates 1000 SCCM as the oxygen gas flow rate QL (the point b in FIG. 8). In a case where the rate γ of nitrogen addition has been set to be 40 PPM in step S11, the control part 20 calculates 500 SCCM as the oxygen gas flow rate QL (the point c in FIG. 8).

After step S13, the control part 20 outputs, as a constant control value, the oxygen gas flow rate value Q0 that has been set in step S11, to the first oxygen flow rate adjustment part 71 (step S14). The control part 20 also outputs, as a constant control value, the nitrogen gas flow rate value Qx that has been set in step S11, to the nitrogen flow rate adjustment part 73 (step S14). The control part 20 also outputs, as a constant control value, the first mixed gas flow rate value Qy that has been calculated in step S12, to the mixed gas flow rate adjustment part 75 (step S14). The control part 20 also outputs, as a constant control value, the oxygen gas flow rate value QL that has been calculated in step S13, to the second oxygen flow rate adjustment part 72 (step S14).

Moreover, the control part 20 outputs, as a constant control value, the pressure value $P_M$ that has been set in step S11, to the first mixed gas pressure adjustor 77 (step S14). The control part 20 also outputs, as a constant control value, the pressure value $P_G$ that has been set in step S11, to the pressure adjustor 6 (step S14).

The above-mentioned output of the control values is performed at any time during the running of the system.

The control part 20 transmits the control values to the oxygen flow rate adjustment parts 71 and 72, the nitrogen flow rate adjustment part 73, and the mixed gas flow rate adjustment part 75, and thereby the second gas mixer 76 generates the raw material gas containing the high-purity nitrogen gas added to the high-purity oxygen gas with the rate γ of nitrogen addition that has been set in step S11.

The control values Q0, Qx, QL, and Qy are constant, and the flow rate adjustment parts 71, 72, 73, and 75 are MFCs that are driven in accordance with the control values. Therefore, the rate γ of nitrogen addition in the raw material gas is constant. That is, the concentration of the generated ozone gas is also stabilized (constant).

When no change occurs in the values set in step S11, the control values outputted in step S14 are constant over time. When a change occurs in the values set in step S11, the control part 20 performs the processing of steps S12 and S13 again. Then, in step S14, the set values changed in step S11, and the value obtained afresh in steps S12 and S13 are outputted as new control values. Here, in a case where the set value γ is constant, even though the set value of the oxygen gas flow rate value Q0 and/or the set value of the nitrogen gas flow rate value Qx is changed, the control part 20 uses the set value obtained as a result of the change (in accordance with the set value obtained as a result of the change), changes the oxygen gas flow rate value QL and the first mixed gas flow rate value Qy, thereby keeping the rate γ of nitrogen addition in the generated raw material gas constant.

Since the ozone generation system 200 includes the gas flow rate adjustment apparatus 7 having the above-described configuration and operation, the raw material gas in which the rate γ of nitrogen addition to the high-purity oxygen gas is always constant within a range of more than zero and not more than 100 PPM (more preferably, 10 PPM≤γ≤100 PPM) can be continuously supplied to the ozone generation apparatus 1.

Accordingly, the ozone generation system 200 is able to suppress a decrease in the amount of generated ozone gas (generate an ozone gas having a less fluctuation and a relatively high concentration), and also to suppress generation of a by-product (that is, a constant minute amount of by-product is generated). Therefore, a high-quality ozone gas can be generated and supplied to the ozone treatment apparatus. In the ozone treatment apparatus, an ozone treatment is performed using this high-quality ozone gas. As a result, a thin film having a higher performance because of ozonolysis can be obtained. On the other hand, corrosion caused by the by-product within the apparatus can be suppressed, which can prevent a deterioration in the performance of the ozone generation system 200 and therefore can prolong the lifespan of the system 200.

Additionally, the gas flow rate adjustment apparatus 7 according to this embodiment, through a plurality of flow rate adjustment parts, generates the raw material gas with the rate γ of nitrogen addition (more than zero and not more than 100 PPM (more preferably, 10 PPM≤γ≤100 PPM)). Therefore, it suffices that the gas flow rate in the nitrogen flow rate adjustment part 73 is set within a range less than 10 SCCM. Thus, minute adjustment of the flow rate is not necessary in the nitrogen flow rate adjustment part 73. This can reduce the cost of the nitrogen flow rate adjustment part 73, which consequently achieves a cost reduction of the ozone generation system 200 as a whole.

In this embodiment, the gas flow rate adjustment apparatus 7 further includes the first mixed gas pressure adjustor 77 that adjusts gas pressure of the first mixed gas. Accordingly, a normal gas flow can be maintained in the gas flow rate adjustment apparatus 7. In other words, an automatic control is made so as to always prevent the gas pressure of the first mixed gas from being equal to or higher than gas pressure in the oxygen supply port 2 and gas pressure in the nitrogen supply port 3.

In this embodiment, an MFC is adopted as each of the flow rate adjustment parts 71, 72, 73, and 75. In response to the constant control values received from the control part 20, the flow rates in the flow rate adjustment parts 71, 72, 73, and 75 are controlled. Accordingly, in the second mixed gas (raw material gas) that is generated and outputted in the gas flow rate adjustment apparatus 7, the rate γ of addition of the nitrogen gas added to the oxygen gas is kept constant.

As thus far described, in this embodiment, the second mixed gas (raw material gas) containing the nitrogen gas added to the oxygen gas with the rate γ of addition of the nitrogen gas being constant, can be generated (that is, a nitrogen concentration in the raw material gas is constant). Therefore, a concentration of the generated ozone gas is also constant. Accordingly, an ozone treatment using such an ozone gas can be performed stably (for example, it is possible to form an oxide film having a higher quality).

Embodiment 2

Figure 9:
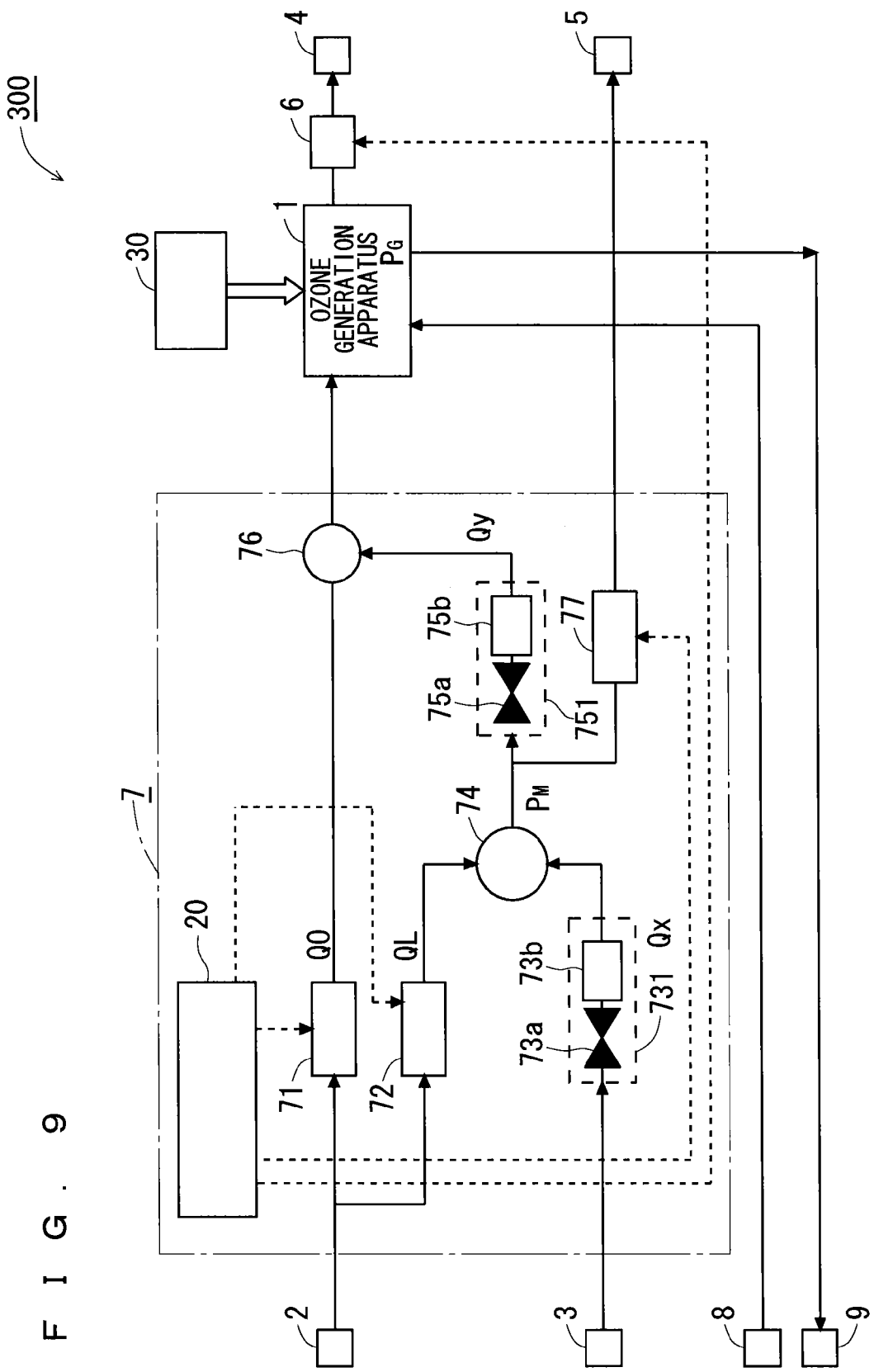
FIG. 9 A block diagram showing a configuration of an ozone generation system 300 according to an embodiment 2.

FIG. 9 is a block diagram showing a configuration of an ozone generation system 300 according to this embodiment.

As seen from comparison of FIG. 9 against FIG. 5, the configuration of the ozone generation system 300 is different from the configuration of the ozone generation system 200, in terms of the following different points. In other words, except for the following different points, the configuration of the ozone generation system 300 is the same as that of the ozone generation system 200. Therefore, in the following, only the different points in the configuration will be described.

In the ozone generation system 200, the nitrogen flow rate adjustment part 73 is an MFC. On the other hand, in the ozone generation system 300, a nitrogen flow rate adjustment part 731 includes a needle valve 73a and a gas flow rate indicator 73b. Thus, in the nitrogen flow rate adjustment part 73, the flow rate value of the nitrogen gas is automatically adjusted in response to the control values from the control part 20. In the nitrogen flow rate adjustment part 731, on the other hand, the user manually adjusts the open/close of the needle valve 73a, and thereby the flow rate value of the nitrogen gas is adjusted.

In the ozone generation system 200, the mixed gas flow rate adjustment part 75 is an MFC. On the other hand, in the ozone generation system 300, a mixed gas flow rate adjustment part 751 includes a needle valve 75a and a gas flow rate indicator 75b. Thus, in the mixed gas flow rate adjustment part 75, the flow rate value of the first mixed gas is automatically adjusted in response to the control values from the control part 20. In the mixed gas flow rate adjustment part 751, on the other hand, the user manually adjusts the open/close of the needle valve 75a, and thereby the flow rate value of the first mixed gas is adjusted.

Figure 10:
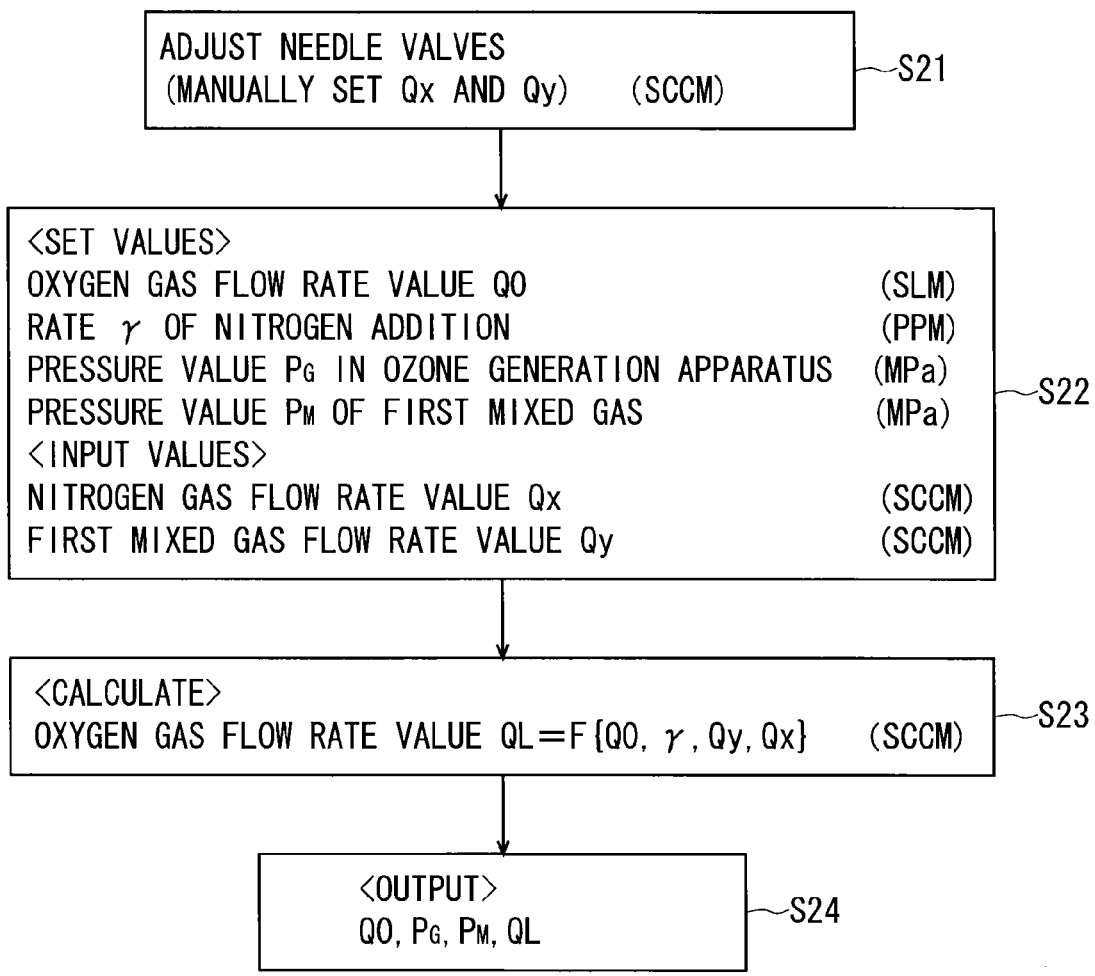
FIG. 10 A diagram showing a flow of a flow rate adjustment operation (nitrogen addition rate γ adjustment operation) in the ozone generation system 300.

Next, with reference to a flow shown in FIG. 10, a description will be given to an operation of the control part 20 (that is, an operation for generating the raw material gas containing nitrogen added to the high-purity oxygen gas with the flow rate of the nitrogen being controlled to a constant value and with the rate of nitrogen addition being more than zero and not more than 100 PPM (more preferably, 10 PPM or more and 100 PPM or less)).

Firstly, the user manually adjusts the aperture of the needle valve 73a, to determine the flow rate value Qx of the high-concentration nitrogen gas that is supplied from the nitrogen supply port 3 within a range of more than zero and not more than 10 SCCM (step S21).

The user also manually adjusts the aperture of the needle valve 75a, to determine the flow rate value Qy of the first mixed gas that is outputted from the first gas mixer 74 within a range of more than zero and not more than 100 SCCM (step S21).

Then, the user sets set values on the control part 20, namely, the oxygen gas flow rate value Q0 (SLM) in the first oxygen flow rate adjustment part 71, the rate γ of nitrogen addition (PPM), the pressure value in the ozone generation apparatus 1 (that is, a control pressure value to be transmitted to the pressure adjustor 6) $P_G$ (MPa), and the pressure value of the first mixed gas (that is, a control pressure value to be transmitted to the first mixed gas pressure adjustor 77) $P_M$ (step S22).

Here, the oxygen gas flow rate value Q0 is set within a range of, for example, 1 SLM to 20 SLM. The rate γ of nitrogen addition is set within a range of 0≤γ≤100 PPM (more preferably, 10 PPM≤γ≤100 PPM). The pressure value $P_M$ is set within a range of less than the pressure value $P_G$ and greater than the pressure values $P_{O2}$, $P_{N2}$. The oxygen gas pressure $P_{O2}$ in the oxygen supply port 2 and the nitrogen gas pressure $P_{N2}$ in the nitrogen supply port 3 are already known.

In step S22, the user inputs as an input value to the control part 20. The input value is the nitrogen gas flow rate value Qx (SCCM) that is displayed on the flow rate indicator 73b after step S21.

In step S22, the user inputs an input value to the control part 20. The input value is the first mixed gas flow rate value Qy (SCCM) that is displayed on the flow rate indicator 75b after step S21.

Then, the control part 20 calculates the oxygen gas flow rate value QL (unit: SCCM) in the second oxygen flow rate adjustment part 72 by using data that is preliminarily set in the control part 20, the set values that have been set in step S22, and the input values that have been inputted in step S22 (step S23).

Here, a relational expression (QL=F{Q0,γ,Qx,Qy}) is adopted as the data that is preliminarily set in the control part 20.

In the function F, γ represents the rate γ of nitrogen addition that has been set in step S22. The rate γ of nitrogen addition is (β·α)×10⁶ (PPM). α represents the ratio of the first mixed gas added to the second mixed gas. β represents the ratio of the nitrogen gas added to the first mixed gas.

In the function F, Q0 represents the oxygen gas flow rate value Q0 that has been set in step S22. In the function F, Qy represents the first mixed gas flow rate value Qy that has been inputted in step S22. In the function F, Qx represents the nitrogen gas flow rate value Qx that has been inputted in step S22.

The relational expression (QL=F{Q0,γ,Qx,Qy}) exhibits the same change as the change in the function graphically shown in FIG. 8. In FIG. 8, α represents the ratio of the first mixed gas added to the second mixed gas. Accordingly, in this embodiment, α shown in FIG. 8 is represented by the first mixed gas flow rate value Qy that has been inputted in step S22 and the oxygen gas flow rate value Q0 that has been set in step S22.

Thus, in step S23, the control part 20 obtains the oxygen gas flow rate QL by using the data indicating the relational expression (QL=F{Q0,γ,Qx,Qy}), the nitrogen gas flow rate Qx that has been inputted in step S22, the rate γ of nitrogen addition that has been set in step S22, the oxygen gas flow rate Q0 that has been set in step S22, and the first mixed gas flow rate Qy that has been inputted in step S22.

Then, the control part 20 outputs, as a constant control value, the oxygen gas flow rate value Q0 that has been set in step S22, to the first oxygen flow rate adjustment part 71 (step S24). The control part 20 also outputs, as a constant control value, the oxygen gas flow rate value QL that has been calculated in step S23, to the second oxygen flow rate adjustment part 72 (step S24).

Moreover, the control part 20 outputs, as a constant control value, the pressure value $P_M$ that has been set in step S22, to the first mixed gas pressure adjustor 77 (step S24). The control part 20 also outputs, as a constant control value, the pressure value $P_G$ that has been set in step S22, to the pressure adjustor 6 (step S24).

The above-mentioned output of the control values is performed at any time during the running of the system.

As a result of the adjustment of the apertures of the needle valves 73a and 75a that has been performed in step S21 and the transmission of the control values from the control part 20 to the oxygen flow rate adjustment parts 71 and 72, the second gas mixer 76 generates the raw material gas containing the high-purity nitrogen gas added to the high-purity oxygen gas with the rate γ of nitrogen addition that has been set in step S22.

The degree of apertures of the needle valves 73a and 75b that have been adjusted in step S21 is constant in steps S22 to S24, too. Therefore, the nitrogen gas flow rate value Qx in the nitrogen flow rate adjustment part 731 and the first mixed gas flow rate value Qy in the mixed gas flow rate adjustment part 751 are constant. The control values Q0 and QL are constant, and the flow rate adjustment parts 71 and 72 are MFCs that are driven in accordance with the control values. Accordingly, the rate γ of nitrogen addition in the raw material gas generated by the gas flow rate adjustment apparatus 7 is also constant.

When no change occurs in the values inputted and/or set in step S22, the control values outputted in step S24 are constant over time. When a change occurs in the values inputted and/or set in step S22, the control part 20 performs the processing of step S23 again. Then, in step S24, the input and/or set values changed in step S22, and the value obtained in step S23 are outputted as new control values.

Here, in a case where the set value γ is constant, even though, for example, the set value of the oxygen gas flow rate value Q0 is changed, the control part 20 uses the set value obtained as a result of the change (in accordance with the set value obtained as a result of the change), changes the oxygen gas flow rate value QL, thereby keeping the rate γ of nitrogen addition in the generated raw material gas constant.

Since the ozone generation system 300 includes the gas flow rate adjustment apparatus 7 having the above-described configuration and operation, the raw material gas in which the rate γ of nitrogen addition to the high-purity oxygen gas is constant within a range of more than zero and not more than 100 PPM (more preferably, 10 PPM≤γ≤100 PPM) can be continuously supplied to the ozone generation apparatus 1.

Accordingly, the ozone generation system 300 is able to suppress a decrease in the amount of generated ozone gas (generate an ozone gas having a less fluctuation and a relatively high concentration), and also to suppress generation of a by-product (that is, a constant minute amount of by-product is generated). Therefore, a high-quality ozone gas can be generated and supplied to the ozone treatment apparatus. In the ozone treatment apparatus, an ozone treatment is performed using this high-quality ozone gas. As a result, a thin film having a higher performance because of ozonolysis can be obtained. On the other hand, corrosion caused by the by-product within the apparatus can be suppressed, which can prevent a deterioration in the performance of the ozone generation system 300 and therefore can prolong the lifespan of the system 300.

Additionally, the nitrogen flow rate adjustment part 731 includes the needle valve 73a, and the mixed gas flow rate adjustment part 751 includes the needle valve 75a. This enables minute adjustment of the flow rate, though manually. Thus, a cost reduction and a size reduction of the gas flow rate adjustment apparatus 7 can be enhanced.

In this embodiment as well, the gas flow rate adjustment apparatus 7, through a plurality of flow rate adjustment parts, generates the raw material gas with the rate γ of nitrogen addition (more than zero and not more than 100 PPM (more preferably, 10 PPM≤γ≤100 PPM)). Therefore, it suffices that the gas flow rate in the nitrogen flow rate adjustment part 731 is set within a range less than 10 SCCM.

In this embodiment as well, the gas flow rate adjustment apparatus 7 further includes the first mixed gas pressure adjustor 77 that adjusts gas pressure of the first mixed gas. Accordingly, a normal gas flow can be maintained in the gas flow rate adjustment apparatus 7. In other words, an automatic control is made so as to always prevent the gas pressure of the first mixed gas from being equal to or higher than gas pressure in the oxygen supply port 2 and gas pressure in the nitrogen supply port 3.

In this embodiment, an MFC is adopted as each of the flow rate adjustment parts 71 and 72. In response to the constant control values received from the control part 20, the flow rates in the flow rate adjustment parts 71 and 72 are controlled.

Accordingly, when the degree of apertures of the needle valves 73a and 75a is fixed and additionally the nitrogen gas flow rate value Qx in the nitrogen flow rate adjustment part 731 and the first mixed gas flow rate value Qy in the mixed gas flow rate adjustment part 751 are fixed, the rate γ of addition of the nitrogen gas added to the oxygen gas is kept constant in the second mixed gas (raw material gas) that is generated and outputted in the gas flow rate adjustment apparatus 7.

As thus far described, in this embodiment, the second mixed gas (raw material gas) containing the nitrogen gas added to the oxygen gas with the rate γ of addition of the nitrogen gas being constant, can be generated (that is, a nitrogen concentration in the raw material gas is constant). Therefore, an extremely small amount of fluctuation occurs in the concentration of the generated ozone. Accordingly, an ozone treatment using a high-quality ozone gas can be performed (for example, this treatment achieves high-quality ozonolysis, which consequently enables an oxide film with a high quality to be formed on an object (wafer) of the ozone treatment).

Embodiment 3

Figure 12:
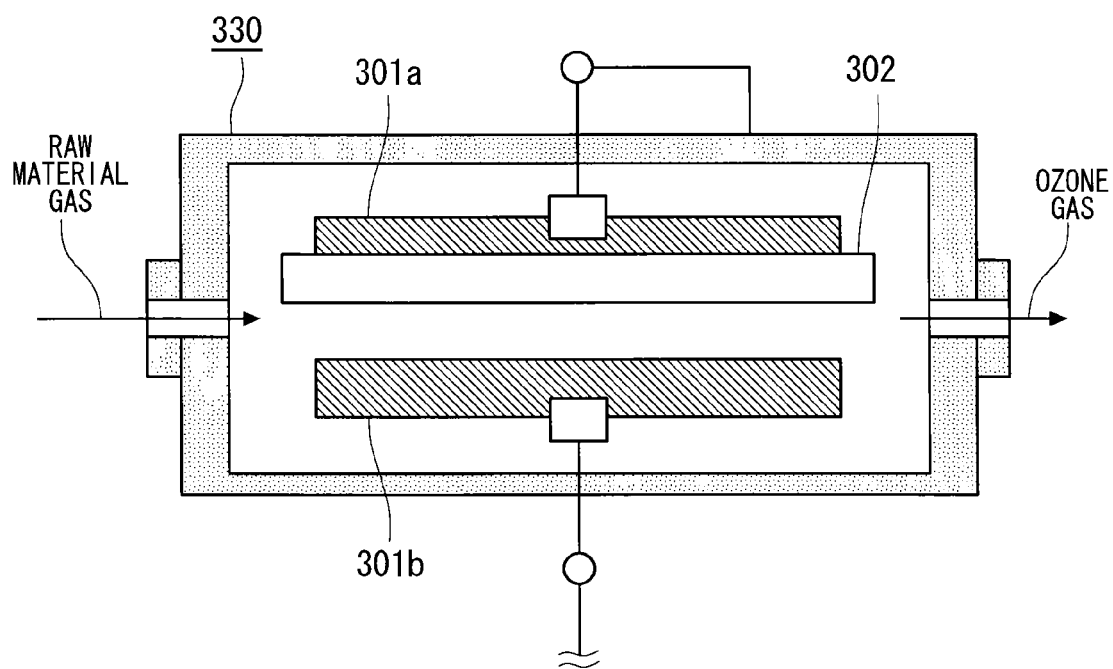
FIG. 12 A diagram showing a configuration of a conventional ozone apparatus 330 of nitrogen-gas-added type.

In the ozone generation apparatus 1 according to the embodiments 1 and 2, two electrodes are arranged with a predetermined space (discharge space) therebetween, and at least one of the electrodes has a dielectric material (for example, see electrodes 301a and 301b and a dielectric material 302 in FIG. 12). The dielectric material is provided at the side facing the discharge space. The ozone generation apparatus 1 applies a predetermined AC voltage between the electrodes, to cause a silent discharge. A raw material gas is supplied to the ozone generation apparatus 1, with the rate γ of nitrogen addition being adjusted as described in the embodiments 1 and 2. The silent discharge acts on the raw material gas, to generate an ozone gas.

Figure 13:
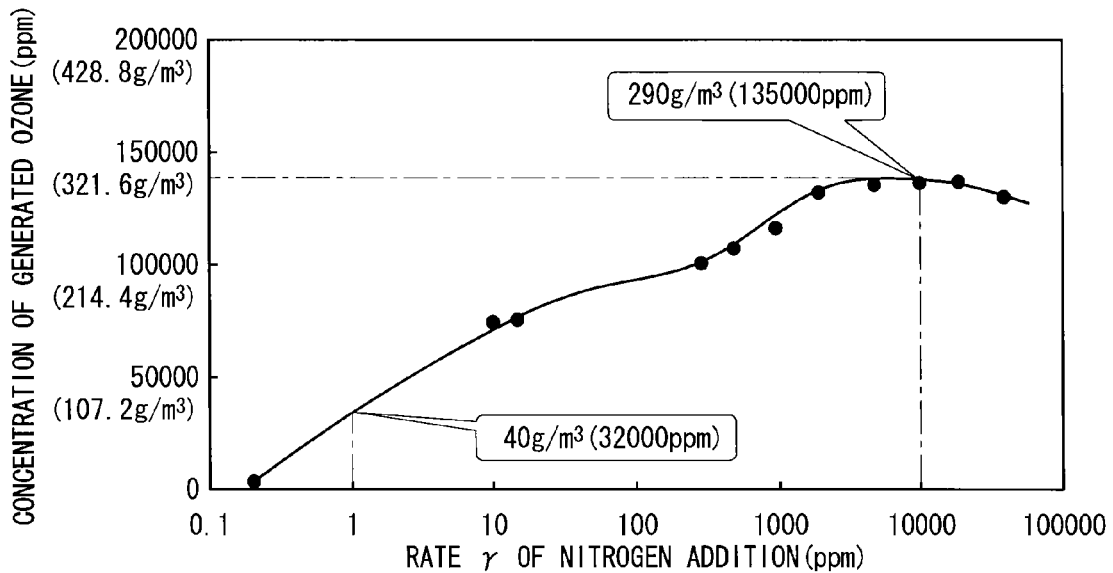
FIG. 13 A diagram showing ozone concentration characteristics of the conventional ozone apparatus 330 of nitrogen-gas-added type relative to the rate γ of nitrogen addition.
Figure 14:
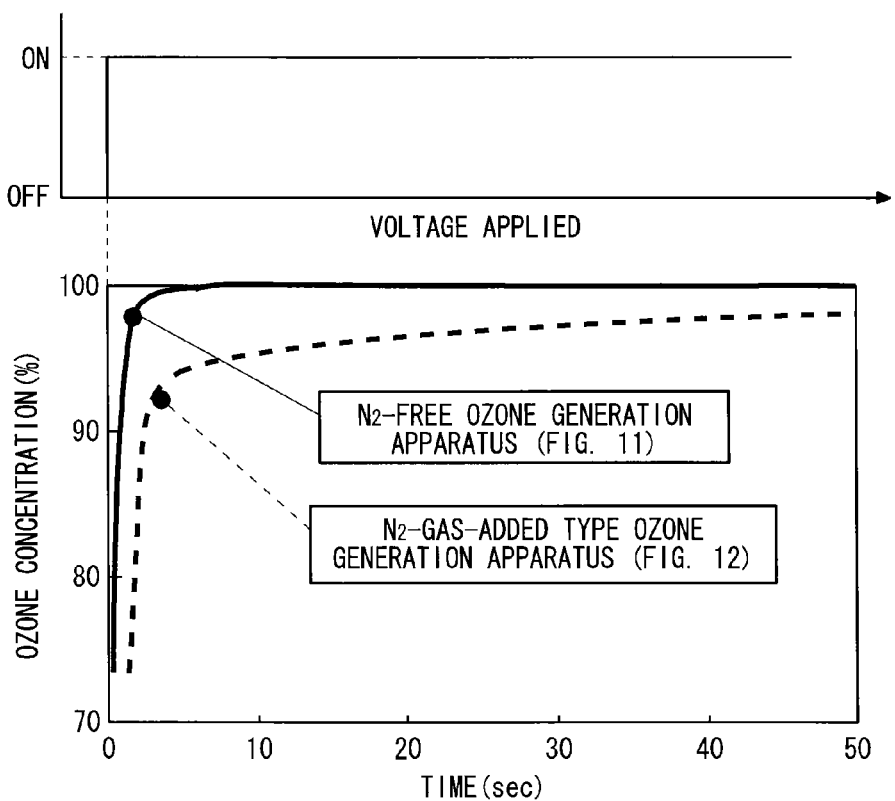
FIG. 14 A diagram showing ozone concentration rise characteristics in a nitrogen-gas-added type ozone apparatus and in a nitrogen-free ozone apparatus.

The ozone generation apparatus 1 configured as described above has a limitation in the concentration of the generated ozone gas, in a case where the rate γ of nitrogen addition in the raw material gas is low (see FIG. 13). On the other hand, the above-described nitrogen-free ozone generation apparatus is able to generate ozone with a high concentration even when no nitrogen gas is added to the raw material gas (that is, even when only the high-concentration oxygen gas is used) (see Patent Document 6).

However, the inventors have found out the following. The above-described nitrogen-free ozone generation apparatus, in practical use, causes a fluctuation in the photocatalytic effect, because a fluctuation occurs in the performance of the photocatalytic material itself applied to the discharge surface and in the light intensity and light wavelength of silent discharge (dielectric material barrier discharge) light due to a minute amount of impurity gas contained in the high-concentration oxygen gas. It has been revealed that such a fluctuation in the photocatalytic effect is a factor for a large fluctuation in the concentration of the generated ozone. From the viewpoint of achieving a high-quality ozone treatment, as described above, it is preferable that a high-quality ozone gas is obtained from the raw material gas whose gas component is sufficiently controlled.

In consideration of studies on the experiments and the like, the inventors have discovered the following. In the nitrogen-free ozone generation apparatus, a raw material gas containing a constant minute amount of nitrogen gas added to a high-concentration oxygen gas (a raw material gas whose gas component is sufficiently controlled) causes a silent discharge with a less fluctuation in the light intensity and light wavelength of discharge light. As a result, the photocatalytic effect caused by the photocatalytic material applied to the discharge surface and the discharge light is more stable. The photocatalytic effect being stabilized enables generation of a high-quality ozone gas with a less fluctuation.

As thus far described, adopting a nitrogen-free ozone generation apparatus as the ozone generation apparatus 1 described in the embodiments 1 and 2 and supplying, to the nitrogen-free ozone generation apparatus, a raw material gas containing a minute amount of high-purity (99.99% or more) nitrogen gas added to a high-purity (99.99% or more) oxygen gas, enables steady generation and output of a more stable, high-quality ozone gas with a high concentration and with a less fluctuation.

As described above, in a case where a nitrogen-free ozone generation apparatus is adopted as the ozone generation apparatus 1 described in the embodiments 1 and 2, it is desirable that a constant minute amount of nitrogen gas is added to the raw material gas. However, an increase in the rate of addition of the nitrogen gas causes generation of a large amount of by-product as described above. This by-product, which may hinder the ozone treatment (for example, an oxide film containing contamination is formed) or may cause corrosion within the apparatus, is a factor for shortening the lifespans of the ozone generation system and the ozone treatment apparatus.

The inventors have found out that the examinations based on FIGS. 1 and 2 are established also in a case where the raw material gas containing nitrogen added to the high-purity oxygen gas with the rate $\gamma$ of nitrogen addition being in a range of more than zero and not more than 100 PPM (more preferably, 10 PPM$\leq\gamma\leq$100 PPM) is supplied to the nitrogen-free ozone generation apparatus (the amount of generated by-product can be suppressed to such a level that an adverse effect caused by the by-product is allowable).

Supplying the raw material gas in which the rate $\gamma$ of nitrogen addition is in the above-mentioned range to the nitrogen-free ozone generation apparatus can generate an ozone gas with a high concentration and a high quality, obtain an excellent performance of the thin film as a result of the ozone treatment using the generated ozone gas, enable stable generation of the ozone gas, and suppress corrosion caused by the by-product within the apparatus.

In order to obtain steady (stable) concentration of the generated ozone gas, as described in embodiments 1 and 2 as well, it is necessary to suppress a fluctuation in the adjustment of the flow rate in the gas flow rate adjustment apparatus 7 (for example, to suppress or prevent a fluctuation in flow rate of the nitrogen gas in the nitrogen flow rate adjustment part 73, 731), to thereby stabilize the rate $\gamma$ of nitrogen addition in the generated raw material gas. As already described, the ozone generation systems 200 and 300 according to the embodiments 1 and 2 enables suppression of a fluctuation in the adjustment of the flow rate in the gas flow rate adjustment apparatus 7 including suppression or prevention of a fluctuation in the flow rate of the nitrogen gas, to thereby stabilize the rate $\gamma$ of nitrogen addition in the generated raw material gas.

Figure 11:
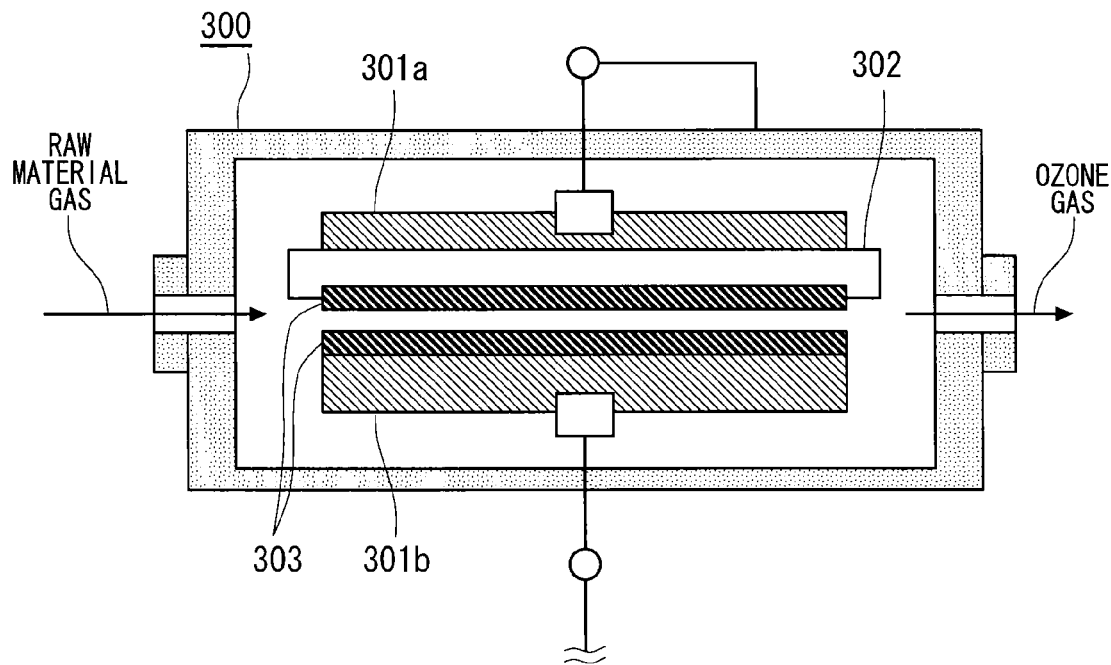
FIG. 11 A diagram showing a configuration of the nitrogen-free ozone apparatus 300.

Here, a configuration of a nitrogen-free ozone generation apparatus 300, which is provided instead of the ozone generation apparatus 1 illustrated in the embodiments 1 and 2, will be described with reference to FIG. 11. FIG. 11 shows an outline configuration of the nitrogen-free ozone apparatus 300.

As shown in FIG. 11, the nitrogen-free ozone generation apparatus 300, to which a raw material gas is supplied from the gas flow rate adjustment apparatus 7, generates and outputs an ozone gas. As described above, the raw material gas generated by the gas flow rate adjustment apparatus 7 contains high-purity nitrogen added to the high-purity oxygen gas, which is a primary component, with the above-described rate $\gamma$ of nitrogen addition.

In the nitrogen-free ozone generation apparatus 300, an electrode 301a having a flat plate shape and an electrode 301b having a flat plate shape are arranged opposed to each other with a predetermined gap therebetween. The predetermined gap serves as a discharge space. A main surface of the electrode 301a is in parallel to a main surface of the electrode 301b. The distance between the electrodes 301a and 301b is greater than zero and not greater than 0.6 mm.

The main surface of the electrode 301a at the predetermined gap side has a dielectric material 302. It may be possible that the main surface of the electrode 301b at the predetermined gap side has a dielectric material, or that the main surfaces of the electrodes 301a and 301b at the predetermined gap side have dielectric materials 301, respectively, though it is different from the illustration in FIG. 11.

A photocatalytic material 303 having a band gap of 2.0 eV to 2.9 eV is provided on a surface of a gas passage (a wall surface of a discharge region=a wall surface of a reaction space) between the electrodes 301a and 301b. In an exemplary configuration shown in FIG. 11, the photocatalytic material 303 is provided on the main surface of the dielectric material 302 at the predetermined gap side, and additionally the photocatalytic material 303 is provided on the main surface of the electrode 301b at the predetermined gap side.

The power supply device 30 shown in FIGS. 5 and 9 applies a high AC voltage between the electrodes 301a and 301b, to cause a silent discharge (dielectric material barrier discharge) via the dielectric material within the discharge space between the electrodes 301a and 301b. Since the electrodes 301a and 301b each having a flat plate shape are opposed and parallel to each other and the dielectric material 302 is formed throughout the entire main surface of the electrode 301a, the silent discharge is caused uniformly over the entire region of the discharge space.

Under a state where the silent discharge is occurring, the raw material gas is outputted from the gas flow rate adjustment apparatus 7 and flows into a space between the electrodes 301a and 301b within the nitrogen-free ozone generator 300. As described above, the primary component of the raw material gas is the oxygen gas, to which the nitrogen gas is added with the rate $\gamma$ of nitrogen addition (0$\leq\gamma\leq$100 PPM (more preferably, 10 PPM$\leq\gamma\leq$100 PPM)).

Due to the silent discharge, discharge light having a wavelength of 428 to 620 nm occurs in the discharge space. A mutual action between the discharge light and the photocatalytic material 303 facing the discharge space causes part of the oxygen gas in the raw material gas to dissociate into oxygen atoms. The gas pressure $P_G$ in the discharge space is kept in a range of, for example, 0.1 MPa to 0.4 MPa, and the action of combining of an oxygen atom obtained as a result of the dissociation with another oxygen molecule contained in the raw material gas (three-body collision) is promoted. Thereby, a high-concentration ozone gas is generated with the oxygen dissociation due to the photocatalytic effect.

More specifically, when discharge light having a specific wavelength and having an extremely high intensity, which is generated by the silent discharge, is emitted to the photocatalytic material 303, the photocatalytic material 303 is excited, so that holes occur in a valance band of the photocatalytic material 303. When the excited photocatalytic material 303 is brought into contact with an oxygen molecule, the photocatalytic material 303 steals an electron from the oxygen molecule. This causes dissociative adsorption of the oxygen molecule, to generate two oxygen atoms. Three-body collision among the generated oxygen atom and an oxygen molecule results in generation of ozone.

Here, in order to increase the amount of dissociation of the oxygen gas into oxygen atoms due to the mutual action between the discharge light and the photocatalytic material 303, it is effective to increase the surface area of the photocatalytic material 303. The increase in the surface area can enhance the quantum effect of a photocatalyst for the dissociation into oxygen atoms. Thus, a high-concentration ozone gas can be generated.

In the exemplary configuration shown in FIG. 11, the simplest configuration is illustrated. FIG. 11 illustrates a configuration having only one electrode cell that includes the electrodes 301a and 301b, the dielectric material 302, and the photocatalytic material 303. Instead, a configuration is also adoptable in which a number of such discharge cells are stacked so that a gas flows in parallel through gas passages, and a discharge is caused on the plurality of discharge cells.

As thus far described, in this embodiment, the nitrogen-free ozone apparatus 300 is adopted as the ozone generation apparatus. Therefore, even when the raw material gas contains only a minute amount of nitrogen gas, a high-concentration ozone gas can be generated. Additionally, since the raw material gas containing a constant minute amount of nitrogen gas is supplied to the nitrogen-free ozone apparatus 300, a fluctuation in the photocatalytic effect of the photocatalytic material 303 is further reduced. As a result, the ozone gas with a stable concentration is generated.

Moreover, the raw material gas that is supplied to the nitrogen-free ozone apparatus 300 contains the nitrogen gas added to the oxygen gas with the rate γ of nitrogen addition (0≤γ≤100 PPM (more preferably, 10 PPM≤γ≤100 PPM)) (in other words, the amount of nitrogen added to the oxygen gas is controlled to the constant value). Therefore, a high-quality ozone gas can be outputted. Furthermore, in the ozone treatment apparatus, an excellent performance of the thin film can be obtained, and generation of a by-product can be suppressed. Due to the suppression of generation of the by-product, corrosion caused by the by-product within the apparatus can be suppressed.

While the invention has been shown and described in detail, the foregoing description is in all aspects illustrative and not restrictive. It is therefore understood that numerous modifications and variations can be devised without departing from the scope of the invention.

DESCRIPTION OF THE REFERENCE NUMERALS 1 ozone generation apparatus
2 oxygen supply port
3 nitrogen supply port
4 ozone gas outlet
5 gas discharge port
6 pressure adjustor
7 gas flow rate adjustment apparatus
8 cooling medium supply port
9 cooling medium outlet
20 control part
30 power supply device
71 first oxygen flow rate adjustment part
72 second oxygen flow rate adjustment part
73, 731 nitrogen flow rate adjustment part
73a, 75a needle valve
73b, 75b gas flow rate indicator
74 first gas mixer
75, 751 mixed gas flow rate adjustment part
76 second gas mixer
77 first mixed gas pressure adjustor
100, 200, 300 ozone generation system
300 nitrogen-free ozone apparatus
301a, 301b electrode
302 dielectric material
303 photocatalytic material
330 ozone generation apparatus
Q0 oxygen gas flow rate (value)
Qx nitrogen gas flow rate (value)
QL oxygen gas flow rate (value)
Qy first mixed gas flow rate (value)
γ rate of nitrogen addition

The invention claimed is:

1. An ozone generation system comprising:
an oxygen supply port;
a nitrogen supply port;
an ozone generation apparatus that generates ozone from an inflowing raw material gas; and
a gas flow rate adjustment apparatus, wherein:
oxygen supplied from the oxygen supply port and nitrogen supplied from the nitrogen supply port flow into the gas flow rate adjustment apparatus; and
the gas flow rate adjustment apparatus adjusts the flow rates of the oxygen and the nitrogen; and
after the adjustment, the gas flow rate adjustment apparatus outputs the oxygen and the nitrogen to serve as the raw material gas to the ozone generation apparatus;
wherein the gas flow rate adjustment apparatus comprises:
a first oxygen flow rate adjustment part connected to the oxygen supply port and configured to adjust the flow rate of the oxygen from the oxygen supply port;
a second oxygen flow rate adjustment part connected to the oxygen supply port and configured to adjust the flow rate of the oxygen from the oxygen supply port;
a nitrogen flow rate adjustment part connected to the nitrogen supply port and configured to adjust the flow rate of the nitrogen from the nitrogen supply port; and
a mixed gas flow rate adjustment part configured to adjust the flow rate of a first mixed gas comprising the oxygen outputted from the second oxygen flow rate adjustment part and the nitrogen outputted from the nitrogen flow rate adjustment part;
wherein the gas flow rate adjustment apparatus is configured to output a second mixed gas that serves as the raw material gas to the ozone generation apparatus; and
the second mixed gas comprising the oxygen outputted from the first oxygen flow rate adjustment part and the first mixed gas outputted from the mixed gas flow rate adjustment part,
wherein the gas flow rate adjustment apparatus is configured to generate the second mixed gas such that the second mixed gas comprises the nitrogen added to the oxygen with the rate of addition of the nitrogen in a range of more than 0 PPM and not more than 100 PPM, by using the first oxygen flow rate adjustment part, the second oxygen flow rate adjustment part, the nitrogen flow rate adjustment part, and the mixed gas flow rate adjustment part.

2. The ozone generation system of claim 1, wherein:
the gas flow rate adjustment apparatus further comprises a pressure adjustor configured to adjust gas pressure of the first mixed gas.

3. The ozone generation system of claim 2, wherein:
the gas flow rate adjustment apparatus outputs the second mixed gas to the ozone generation apparatus such that the second mixed gas comprises the nitrogen added to the oxygen with a constant rate of addition.

4. The ozone generation system of claim 3, wherein:
the gas flow rate adjustment apparatus further comprises a control part that controls the flow rate in the gas flow rate adjustment apparatus, wherein:
the control part controls the flow rate of the oxygen in the second oxygen flow rate adjustment part and the flow rate of the first mixed gas in the mixed gas flow rate adjustment part based on a flow rate value of the oxygen in the first oxygen flow rate adjustment part and a flow rate value of the nitrogen in the nitrogen flow rate adjustment part such that the second mixed gas generated by the gas flow rate adjustment apparatus comprises the nitrogen added to the oxygen with a constant rate of addition.

5. The ozone generation system of claim 3, wherein:
each of the nitrogen flow rate adjustment parts and the mixed gas flow rate adjustment parts comprises a valve and a flow rate indicator;
the gas flow rate adjustment apparatus further comprises a control part that controls the flow rate in the gas flow rate adjustment apparatus;
the control part controls the flow rate of the oxygen in the second oxygen flow rate adjustment part such that the second mixed gas generated by the gas flow rate adjustment apparatus comprises the nitrogen added to the oxygen with a constant rate of addition based on a flow rate value of the oxygen in the first oxygen flow rate adjustment part, a flow rate value of the nitrogen that is read from the flow rate indicator after adjustment of the valve in the nitrogen flow rate adjustment part, and a flow rate value of the first mixed gas that is read from the flow rate indicator after adjustment of the valve in the mixed gas flow rate adjustment part.

6. The ozone generation system of claim 1, wherein:
the ozone generation apparatus comprises:
a first electrode;
a second electrode arranged opposed to the first electrode with a gap formed therebetween; and
a photocatalytic material arranged facing the gap wherein the photocatalytic material has a predetermined band gap,
wherein the ozone generation apparatus is configured to apply an AC voltage between the first electrode and the second electrode to cause a discharge in the gap, causing the oxygen contained in the second mixed gas that is supplied into the gap to dissociate into oxygen atoms by means of discharge light of the discharge and the photocatalytic material, and causing the oxygen contained in the second mixed gas to bind with the oxygen atom obtained as a result of the dissociation to generate ozone.

* * * * *